United States Patent [19]
Wrigley

[11] Patent Number: 5,933,146
[45] Date of Patent: Aug. 3, 1999

[54] METHOD OF AND APPARATUS FOR CONSTRUCTING AN IMAGE OF A NOTIONAL SCENE BY A PROCESS OF RAY TRACING

[75] Inventor: Adrian Wrigley, Cambridge, United Kingdom

[73] Assignee: Advanced Rendering Technology Limited, Cambridge, United Kingdom

[21] Appl. No.: 08/849,596

[22] PCT Filed: Nov. 30, 1995

[86] PCT No.: PCT/GB95/02798

§ 371 Date: May 28, 1997

§ 102(e) Date: May 28, 1997

[87] PCT Pub. No.: WO96/17326

PCT Pub. Date: Jun. 6, 1996

[30] Foreign Application Priority Data

Dec. 1, 1994 [GB] United Kingdom .................. 9424273

[51] Int. Cl.[6] .................................................. G06T 17/00
[52] U.S. Cl. ............................................ 345/420; 345/426
[58] Field of Search ................................. 345/420, 421, 345/422, 426

[56] References Cited

U.S. PATENT DOCUMENTS 4,928,250  5/1990  Greenberg et al. ...................... 345/426
5,485,556  1/1996  Takagi et al. ........................... 345/426
5,583,975  12/1996  Naka et al. ............................. 345/426

*Primary Examiner*—Mark R. Powell
*Assistant Examiner*—Huedung X. Cao
*Attorney, Agent, or Firm*—Lee, Mann, Smith, McWilliams, Sweeney & Ohlson

[57] ABSTRACT

A ray tracing method for construction an image of a notional scene from data concerning a plurality of objects in the scene and the illumination of the scene, involves allocating surfaces of objects in the scene into a plurality of subsets, projecting from a notional viewing position a plurality of straight line paths and storing data for all said paths, determining which, if any, of those straight line paths intersect any surface in a selected subset or a zone of illumination, and repeating that step for all the other subsets until all the paths have been tested for intersections against all surfaces in the scene. The method also determines, for each path, which intersection is nearest the viewing position and stores data on the co-ordinates for that intersection and on the surface of the object or zone of illumination at that intersection. The intensity in colour of light which will pass along the path through the notional viewing position from that intersection is then calculated and stored, and the stored intensity and/or colour is then used to produce a picture signal for a visual display. A plurality of paths are tested for intersections against a given subset of surfaces before the paths are considered in relation to other subsets, thereby reducing the number of times the subsets have to be called up from the database. The method can be conducted on apparatus which uses parallel ray processors.

21 Claims, 18 Drawing Sheets

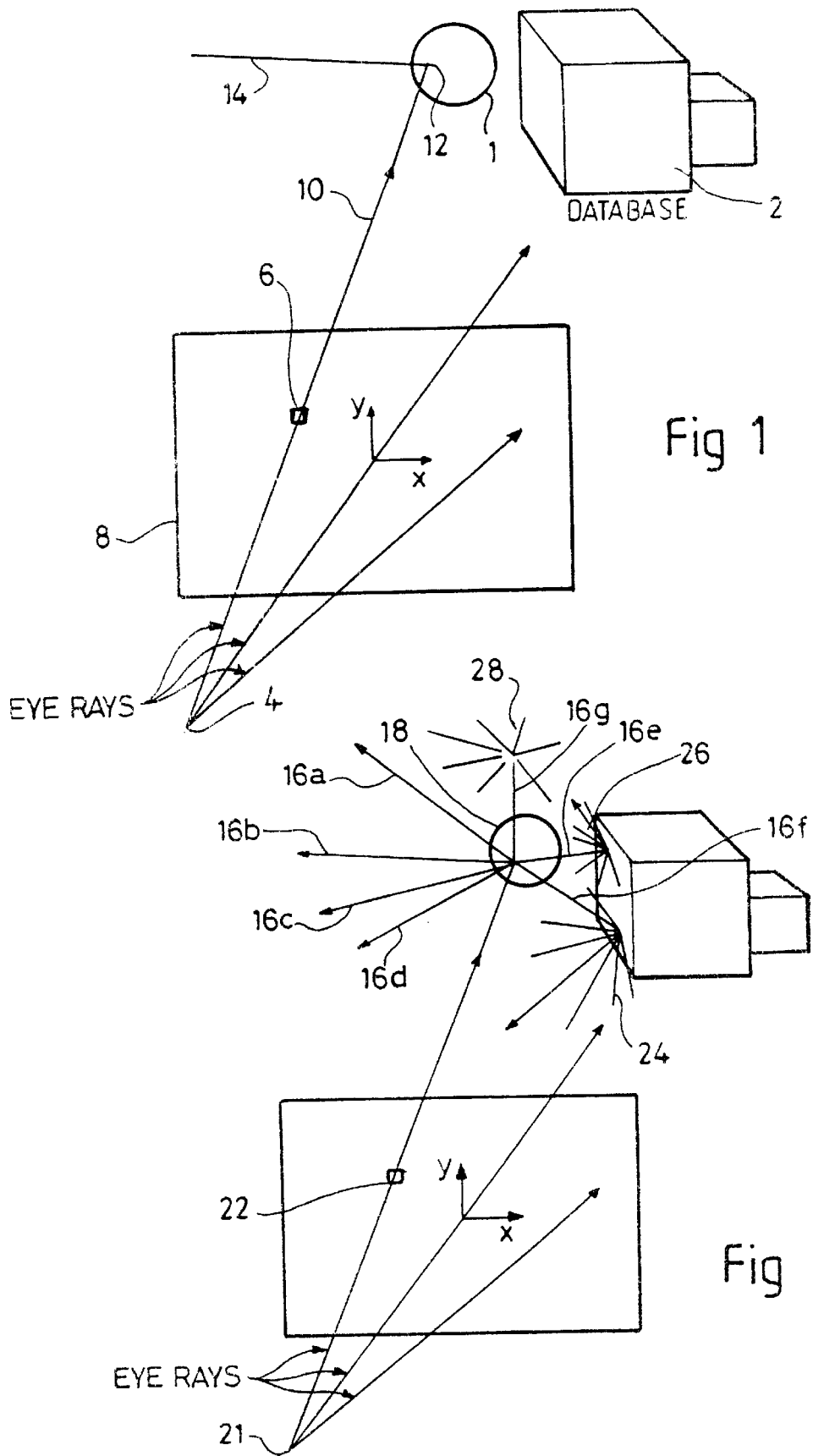

Key to diagrams

| | |
|---|---|
| Add | Pipelined adder |
| Sub | Pipelined subtracter |
| Mul | Pipelined multiplier |
| Div | Pipelined divider |
| Qadd | Pipelined add in quadrature |
| Pipe | Pipeline 1 stage delay (null) |
| Square | Pipelined squarer |
| Sqrt | Pipelined square root |
| Cmp | Pipelined compare ( A > B ) |

RAY TREE FOR DISTRIBUTED RAY TRACING WITH ONLY ONE RAY RANDOMLY TRACED FROM EACH INTERSECTION

METHOD OF AND APPARATUS FOR CONSTRUCTING AN IMAGE OF A NOTIONAL SCENE BY A PROCESS OF RAY TRACING

FIELD OF THE INVENTION

This invention relates to a method of, and apparatus for, constructing an image of a notional scene. The invention is particularly concerned with the construction of images by a process of ray tracing.

BACKGROUND TO THE INVENTION

Ray tracing is one of a number of processes by which a computer can generate an image of a notional scene containing, for example, one or more objects illuminated by one or more localised light sources, or by ambient light.

The ray tracing process determines, for each pixel to constitute the image, whether any light rays would pass from the scene through the co-ordinates defining the position of the pixel relative to the scene and to a notional viewing position. The contributions made by any such rays to the notional intensity and colour of light incident on the viewing position are then calculated. This information determines the required brightness and colour for the pixel. A basic ray-tracing method is described in the article entitled "An Improved Illumination Model for Shaded Display", in Communications of the ACM, 26 (6), 342–349 (Whitted 1980).

Ray tracing enables a high resolution of image to be created, and can depict phenomena such as reflection, refraction and light scattering.

However, a large number of calculations have to be performed in order to determine the path (and characteristics) of each light ray, as a result of which a ray tracing method tends to be very slow.

SUMMARY OF THE INVENTION

According to one aspect of the invention there is provided a method of constructing an image of a notional scene, containing a plurality of objects, as viewed from one of a plurality of possible viewing positions and illuminated in a known manner, from information on the co-ordinates of the surfaces of the objects, on the optical characteristics of all the points on those surfaces and on the particular illumination, which information is stored in a computer memory, the method comprising:

A. Projecting from the viewing position a plurality of straight line paths and storing data describing all said paths;

B. For one of the objects, determining which, if any, of the straight line paths intersect a surface of the object or a zone of illumination and for each intersecting path determining the co-ordinates of the intersection nearest the viewing position and storing all said intersections;

C. Repeating step B above for the other object or for each other object in turn;

D. Determining, for each path, the nearest intersection to the viewing position and storing same with data on the object surface at that intersection;

E. Determining, for the stored surface data, the light which will pass along the path to the viewing position for each said nearest intersection and storing same as light intensity and position data; and F. Reading out the stored light intensity and position data to produce a picture signal display on a visual display.

Since all of said plurality of the straight line paths are considered in relation to the or each subset in turn, details of the surfaces in each subset only have to be retrieved from the memory once in order to determine all the intersections of those straight line paths with those surfaces. Consequently the number of times that details of surfaces have to be retrieved from the memory and hence the associated time delay, is minimised, as a result of which the ray tracing method can be performed more rapidly than known methods in which details of each surface have to be retrieved at least once per path.

Said plurality of straight line paths might be just some, but preferably constitute all, of the straight line paths needed to construct the image.

Preferably, each subset contains the surfaces of a respective one of the objects.

Preferably step E above involves projecting a set of one or more secondary straight line paths from the intersection, if the characteristics of the object surface at the intersection are such that light, if incident on the interface along a direction defined by the/or each secondary path, would be at least partially directed towards said viewing position along the previous path; determining the intersections of the secondary paths with other objects (or light sources) nearest the intersection in accordance with steps B and C above; calculating from data on the intersections of the secondary paths, at least the intensity of any light incident on the intersections of the original straight line paths in the directions defined by said secondary paths and, from the information on surface characteristics of the objects at the intersections on the original paths, calculating at least the intensity of the light incident on the viewing position along the original paths.

The method can thus take into account the effect on the appearance of one object of light scattered or reflected from, or refracted through another object.

A more accurate determination of the intensity of light incident on the viewing position can be obtained by projecting one or more further sets of straight line paths in a similar fashion to the secondary straight line paths from the selected intersections of the previous set of straight line paths and determining the intensity of light incident on the intersections along directions defined by said further set of paths.

Preferably, in addition to the intensity, the colour of any light to be emitted by the pixel is also determined. This can be done by regarding the light as a combination of different colour components (for example red, green and blue), the relative magnitudes of which define the colour of the light, and considering the combined effect on each component of interactions at the relevant interfaces.

Preferably, the process of determining which straight line paths intersect a selected surface includes the step of determining for each path whether the path intersects a notional envelope which contains said surface, and discarding the path from further consideration in relation to the surface if it does not intersect the envelope.

Thus the notional object envelope can be used to reduce the number of paths which need to be considered in relation to the precise co-ordinates of the object surfaces, since any path which does not intersect an envelope cannot intersect a surface contained therein.

The number of paths which need to be considered in relation to the envelope can be reduced by determining which paths intersect a larger envelope which contains a plurality of envelopes, and discarding paths which do not intersect said larger envelope from consideration in relation to the other envelopes.

If the surface characteristic of an object at the intersection of a path is such that incident light thereon would be diffused or scattered in a multitude of directions, a large number of further ray vectors, originating at that interface, would be required accurately to represent the possible directions of incident light rays which would be directed along the path defined by the intersecting ray vector. In such a case, conveniently only one such further path, having a randomly selected direction, is generated.

Generating only one such further path at random reduces the accuracy of the calculation of the required intensity for a pixel to constitute part of the image, but, if a sufficient number of intersections occur in a region of the object which has the aforesaid characteristic, the random nature of the further paths generated at the intersections will tend to compensate for such inaccuracies, particularly if more than one straight line path (on average) is projected from the viewing position for each pixel, as happens in super sampling methods used to reduce the amount of aliasing in the final image.

According to another aspect of the invention, there is provided apparatus for constructing an image of a notional scene containing a plurality of objects as viewed from one of a plurality of possible viewing positions, the apparatus comprising:

a memory on which information on the co-ordinates of the surfaces of the objects, the optical characteristics of all the points on those surfaces and on the illumination for the scene is stored;

ray tracing means for projecting from the viewing position a plurality of straight line paths, and for determining which, if any, of the paths intersect a surface of each object and for selecting the intersections of each path closest to the viewing position;

calculating means for determining, from the data on the object surfaces at said intersections and on the illumination of the scene, at least the intensity of the light which will pass along each said path to the viewing position; and output means for generating a picture signal, representative of said intensities, for display on a visual display, wherein all the intersections for the first object selected by the ray tracing means are determined before the intersections with the/or each other object, so that the intersections are determined in respect of each object in turn.

Preferably, the ray tracing means comprises a plurality of data processors which are connected to the memory, and which are so arranged that each processor generates a respective group of straight line paths for a respective part of the image, the intersections of each group with a selected object being determined simultaneously.

This feature is of particular advantage since details about the object are retrieved from the memory by the processors simultaneously. This avoids the "bottle neck" which would occur if different processors required information on different objects at any one time.

Preferably, each processor comprises a dedicated chip specifically configured to perform the ray tracing operations. This enables the process to be more rapidly performed than would be the case if each processor consisted of a general purpose chip in combination with specific software.

Preferably, the calculating means is so arranged so as to combine the effects of the interactions of a notional light ray at the relevant interfaces by a process of logarithmic arithmetic.

This enables the Very Large Scale Integration (VLSI) calculations needed to make such a combination to be performed relatively quickly, which more than compensates for the additional time needed to convert the initial values into their logarithmic equivalents.

BRIEF DESCRIPTION OF THE DRAWINGS

The invention will now be described, by way of example only, with reference to the accompanying drawings in which:

FIGS. 1 and 2 illustrate the basic principles of a ray tracing method;

DETAILED DESCRIPTION

Figure 3:
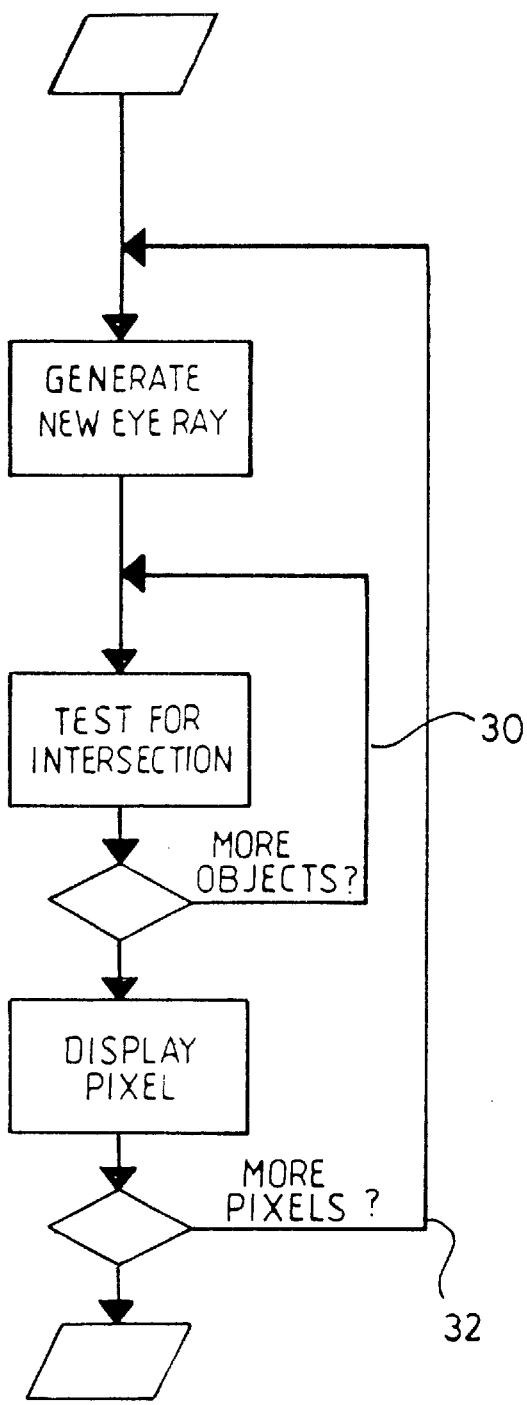
FIG. 3 is a flow chart illustrating the steps involved in the prior art methods of ray tracing.

With reference to FIG. 1, a process of ray tracing can be used to construct an image of a notional scene which contains objects, 1 and 2, as viewed from a predetermined viewing position 4. The image is to be constituted by a plurality of pixels the position of one of which relative to the scene is indicated by the reference number 6. The pixels all lie in an image plane 8 interposed between the viewing position 4 and the scene. The elements shown in FIG. 1 are initially in the form of data in a computer database, but the plane 8 and the viewing position 4 respectively correspond to the screen on which the image is ultimately displayed, and the position of a viewer relative to the scene.

A primary straight line path 10 is projected from the viewing position 4, and passes through the pixel position 6. The path 10 can be considered to be of infinite length. All the intersections between the path 10 and objects or other elements (such as light sources) in the notional scene are compared, and all but the intersection nearest the position 4 are disregarded. In the case of the path 10 the nearest intersection is with a surface of the spherical object 1 at a point 12.

The database contains information on a number of visually apparent characteristics of the object 1 which enable various possible interactions of light with the object 1 to be simulated. That information includes information on the directions of normals to the surface of the object 1 at various points, including intersection 12, and on any light reflecting or scattering qualities of the object 1 at various points on its surface (including intersection 12).

In the present example, the object 1 is opaque, and as a result will only reflect or scatter incident light. However images of transparent or translucent objects can also be generated, in which case the database will also store information on the light transmitting properties of such objects.

A secondary path 14 is generated since light incident on the interface 12 in the direction along a path defined by the path 14 would be at least partially reflected, refracted or scattered along the path 10, and intersections of the path 14 with any other objects/light sources can be analysed in the same way as with the path 10, but in this case all intersections other than that closest to the intersection 12 are disregarded.

If the process only considers primary and secondary paths the required intensity of the pixel 6 is then determined by calculating the effect of the intersections on the intensity of a notional incoming light ray travelling along the paths 10 and 14. Thus, if the selected intersection of the path 14 is with a bright light source, a relatively high intensity value would initially be allocated. However, if the object 1 is a very effective absorber of light, the intensity will be considerably reduced. In addition, if the path 14 does not intersect any light source or any zone of ambient light, then a zero intensity value will be allocated. Thus in this case the final intensity value for the pixel is determined from the allocated intensity values of the selected intersections of the paths.

In a similar fashion, the associated colour of the incoming ray (which can be represented by relative intensities of red blue and green components) is also determined. The intensity and colour of the notional light ray will represent the required brightness and colour to be displayed by the pixel 6. Once this calculation has been made for all the pixels, the image can be displayed.

The image can be displayed by any suitable means, for example on a Cathode Ray Tube (CRT) or by being printed on a photo sensitive film.

In the example shown in FIG. 1, the surface of the object 1 is reflective so that only one secondary path 14 is generated at the interface 12. However, if the object 1 had a rough surface, incident light would tend to be scattered, as a result of which light incident on the interface 12 on any one of a multitude of directions could be directed along the path defined by the primary vector 10.

Such a situation is illustrated in FIG. 2, in which the references 16a–f denote possible secondary paths which could be generated at the interface between a spherical textured object 18 and a path 20 which originates at a viewing position 21 and passes through a pixel 22.

In the arrangement shown in FIG. 2, the paths 16e–g also intersect light scattering objects, and the process illustrated includes the step of projecting a further set of paths from the intersections of those secondary paths. Three groups of such paths are shown at 24, 26 and 28. In some variants of the method, further sets of paths can be generated in a similar fashion, depending upon the required accuracy for the calculation for each pixel.

In order to reduce the number of calculations required, a preferred feature of the method of the invention is to select only one of the vectors which could be generated at the interface between a vector of the previous set and a light scattering surface. Thus, in this example, only one of the vectors 16 is selected at random, and if the selected vector is 16e–g only one vector from the associated group of tertiary vectors is selected at random.

With reference to the flow chart shown in FIG. 3, known ray tracing methods determine the intersections of each path with any of the objects in the scene independently of the other paths. Thus the ray tracing circuitry used in such a method has to retrieve from a database information on all the objects at least once for each path (referred to as an "eye ray" in the chart). Consequently, the information on the objects has to be retrieved a large number of times, as is indicated by the nesting of the object programming loop 30 and pixel programming loop 32.

Figure 4:
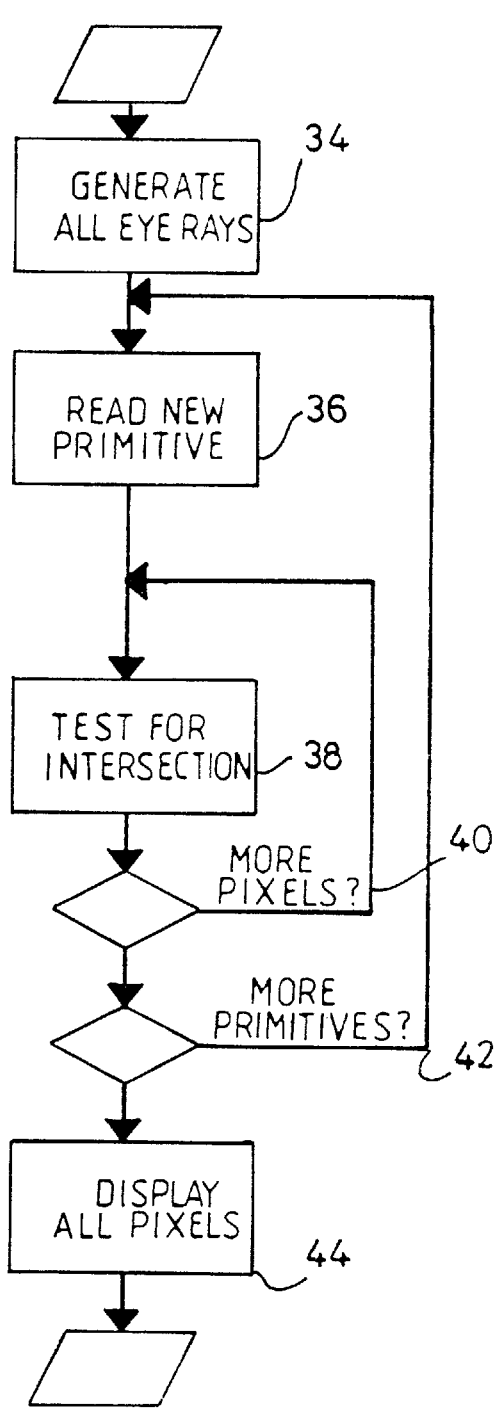
FIG. 4 is a corresponding flow chart for a method in accordance with the invention.

Referring to FIG. 4, the method according to the invention initially projects all the paths in a given set (primary, secondary, tertiary etc), as is indicated by box 34. The circuitry retrieves details of a given primitive as indicated in box 36, and determines which of the paths intersects that primitive (box 38). All the paths of any given set are considered in relation to the object before details of any other object are called up, and consequently the details of the objects are retrieved fewer times than is the case with the known method. This is illustrated by the nesting of the loop 40, which represents the repetition of the tests for intersection for each path, within the loop 42, which represents the retrieval of information about further primitives.

Once the ray tracing process has been completed, an output signal, representative of the required colour and brightness for all the pixels, is generated (as represented by block 44).

Figure 5:
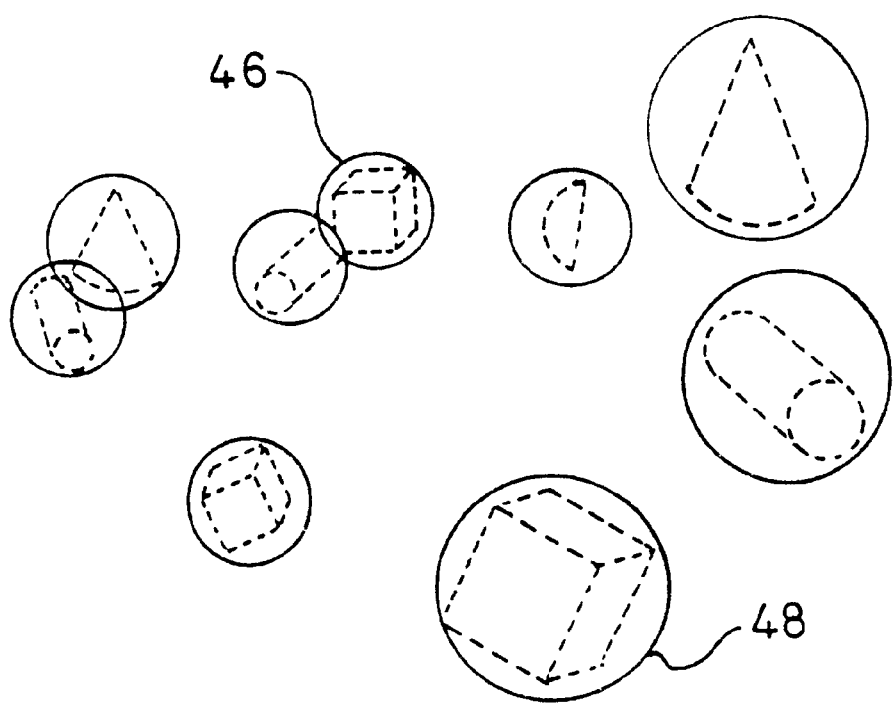
FIGS. 5 and 6 are diagrams illustrating further stages in a method in accordance with the invention.
Figure 6:
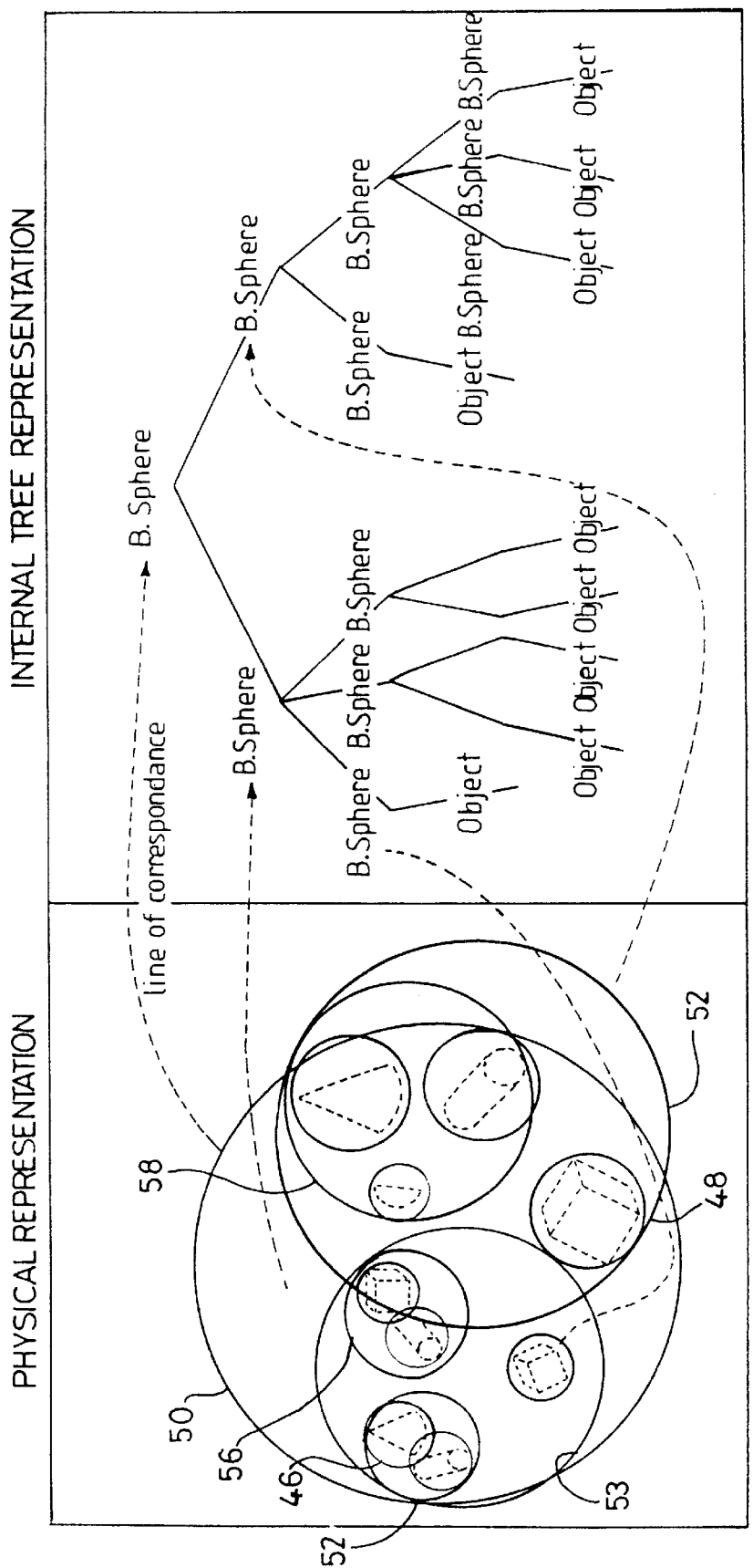
Figure 7:
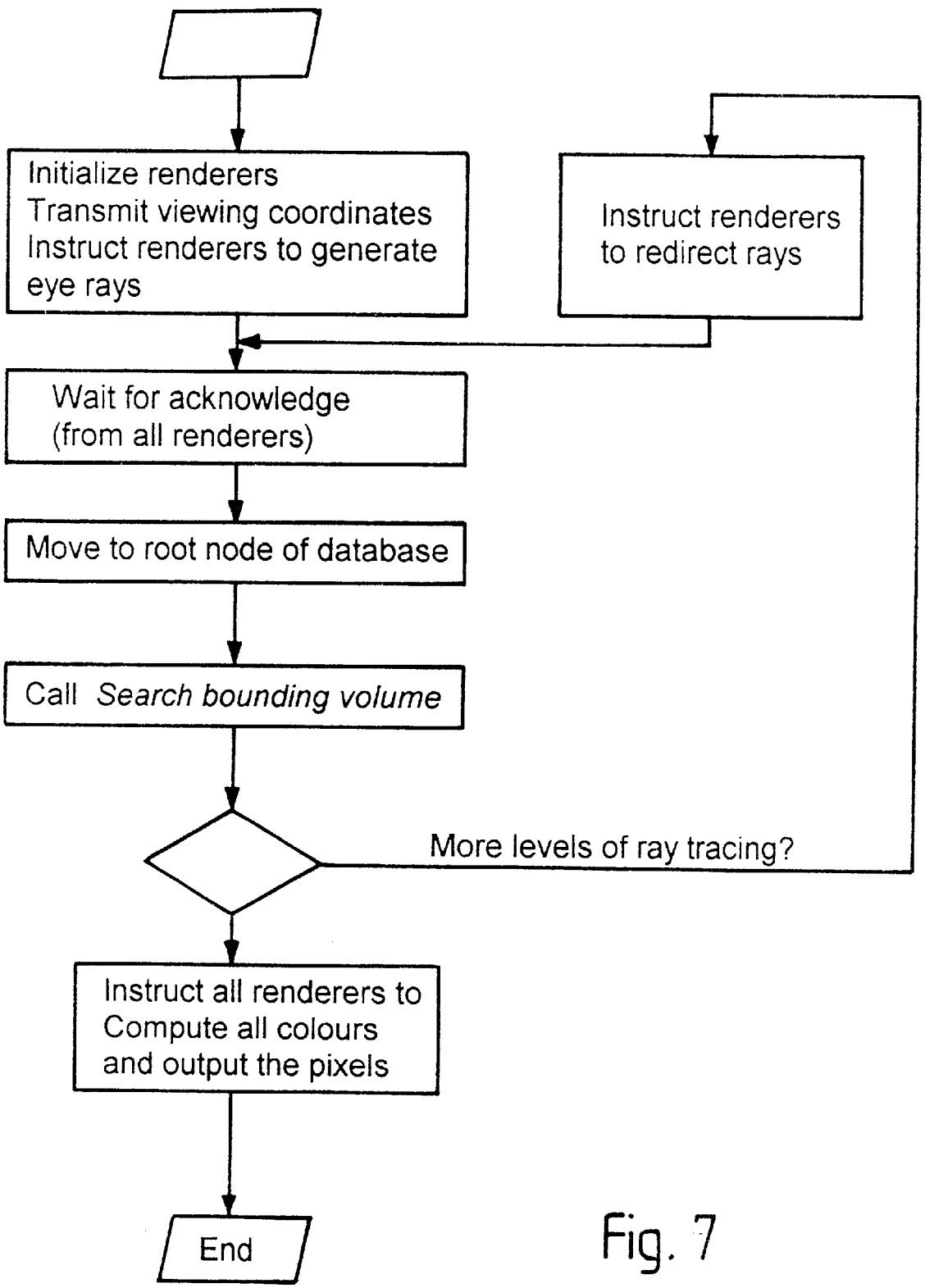
FIGS. 7 and 8 are flow charts showing the various steps involved in those stages.
Figure 8:
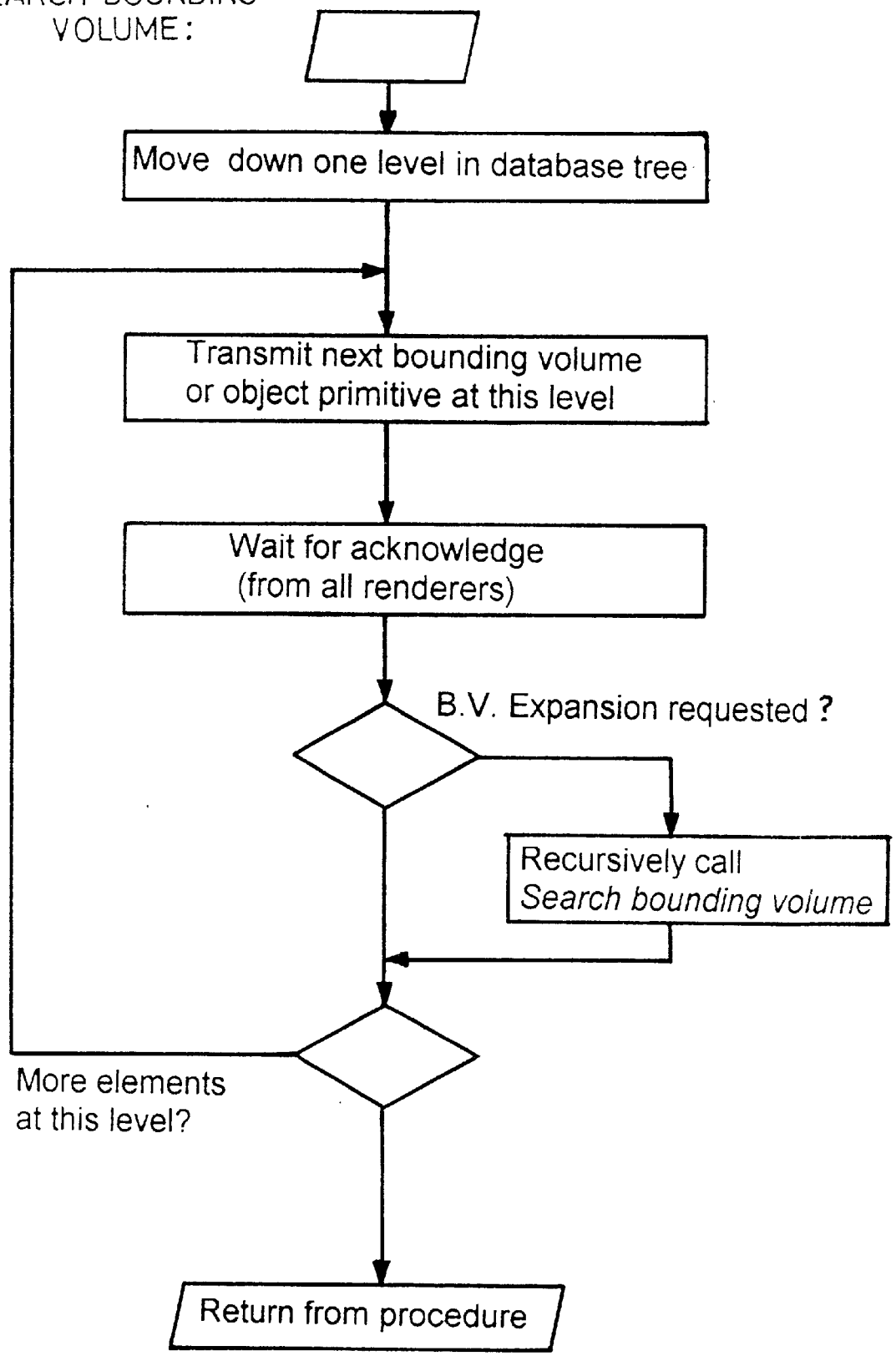

FIGS. 5–7 illustrate the various stages involved in the intersection test represented by box 38. The data base which contains information on the objects also contains information on notional spherical bounding envelopes, the co-ordinates of which are such that each envelope contains a respective object. FIG. 5 shows a number of objects to be depicted in a scene, and the bounding envelopes, such as 46 and 48 for each object.

The database also contains the co-ordinates of larger notional bounding envelopes, each of which contains one or more object envelopes.

Examples of such larger envelopes are shown at 50, 52, 54, 56 and 58.

Before considering a path in relation to the actual co-ordinates of an object, the process determines whether the path intersects successive envelopes which contain the object (but not the origin of the path). The path is disregarded if it does not intersect all such envelopes.

Thus, in the example shown in FIG. 6, the process of determining whether a primary path projected from a point directly above the plane of FIG. 6 will intersect the object contained in the envelope 46 involves the initial stage of determining whether the path intersects the envelope 50. If no such intersection occurs the path is disregarded because it cannot intersect the envelope 46, but if there is such an intersection the question of whether the path also intersects the envelope 53 is then considered. If such an intersection occurs, the process is repeated for the envelope 52, and then the envelope 46 before the path is considered in relation to the actual co-ordinates of the surfaces of the object.

The internal tree representation of FIG. 6 shows the various alternatives which arise when analysing a given primary path in relation to any of the objects.

Figure 9:
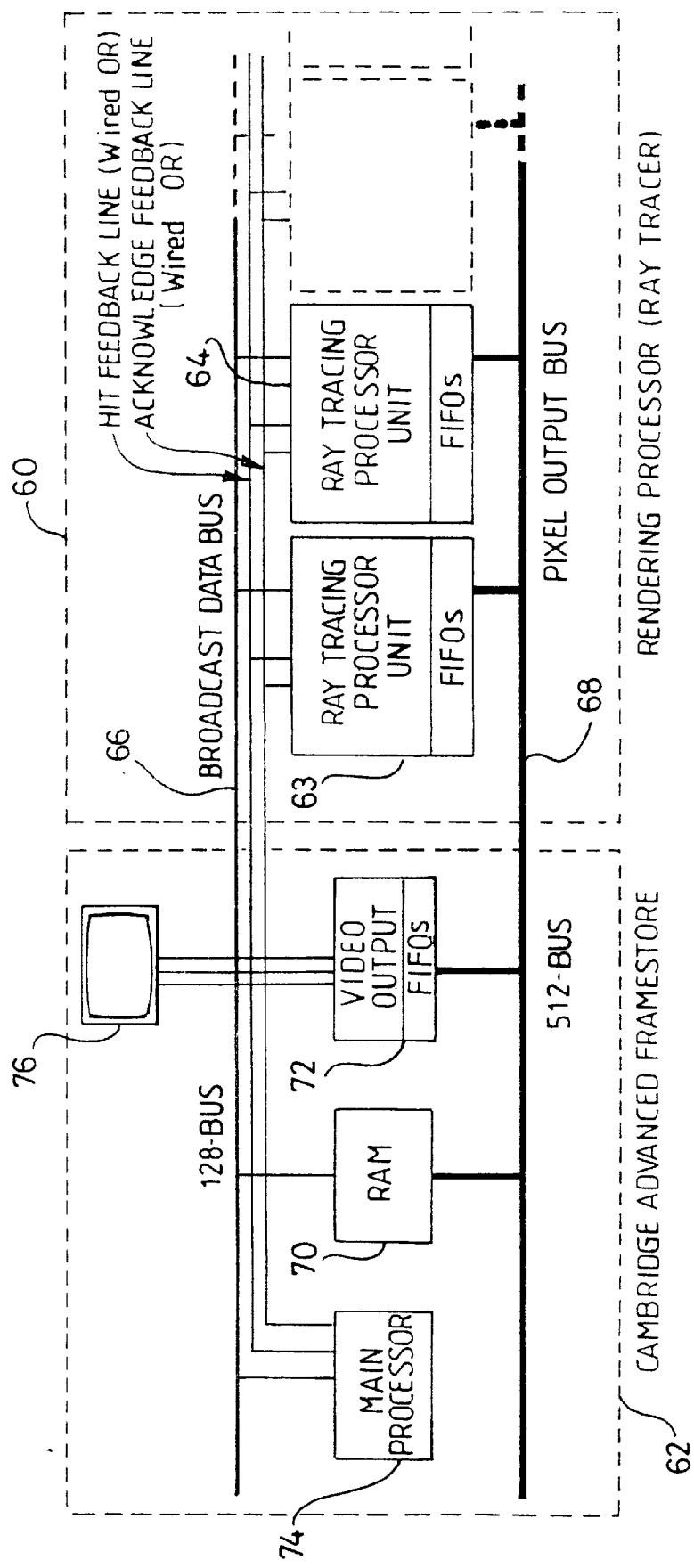
FIG. 9 is a block diagram of ray tracing apparatus, also in accordance with the invention.

With reference to FIG. 9, the block 60 represents the ray tracing apparatus which generates the paths, determines the intersections and calculates the required pixel output. The apparatus comprises a number of ray tracing units, for example 63 and 64 connected in parallel to a broadcast data bus 66, which is in turn connected to a computer memory (not shown) which contains the required information on the objects in the scene to be depicted and on the bounding envelopes.

Each of the ray tracing units is operable to generate an output signal representative of the required output for a number of pixels allocated to that unit, and that output signal is relayed along a pixel output bus 68 connected in parallel to all of the ray tracing processors, and to a memory 70 and video output signal generator 72 of a frame store device indicated by the block 62. The device 62 includes a main (or host) processor 74 for controlling other units in the apparatus 60 and 62. The unit 72 converts the signal from the output of the ray tracing processors into a video signal to be displayed on a CRT display 76.

Figure 10:
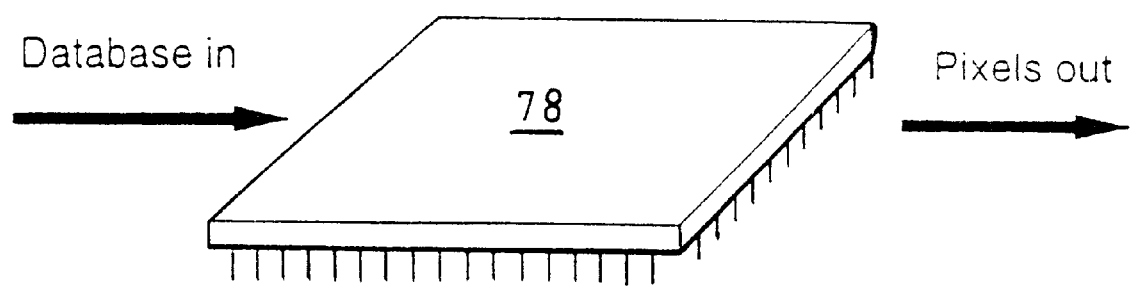
FIG. 10 is an isometric diagrammatic external view of a chip forming part of the apparatus shown in FIG. 9.
Figure 11:
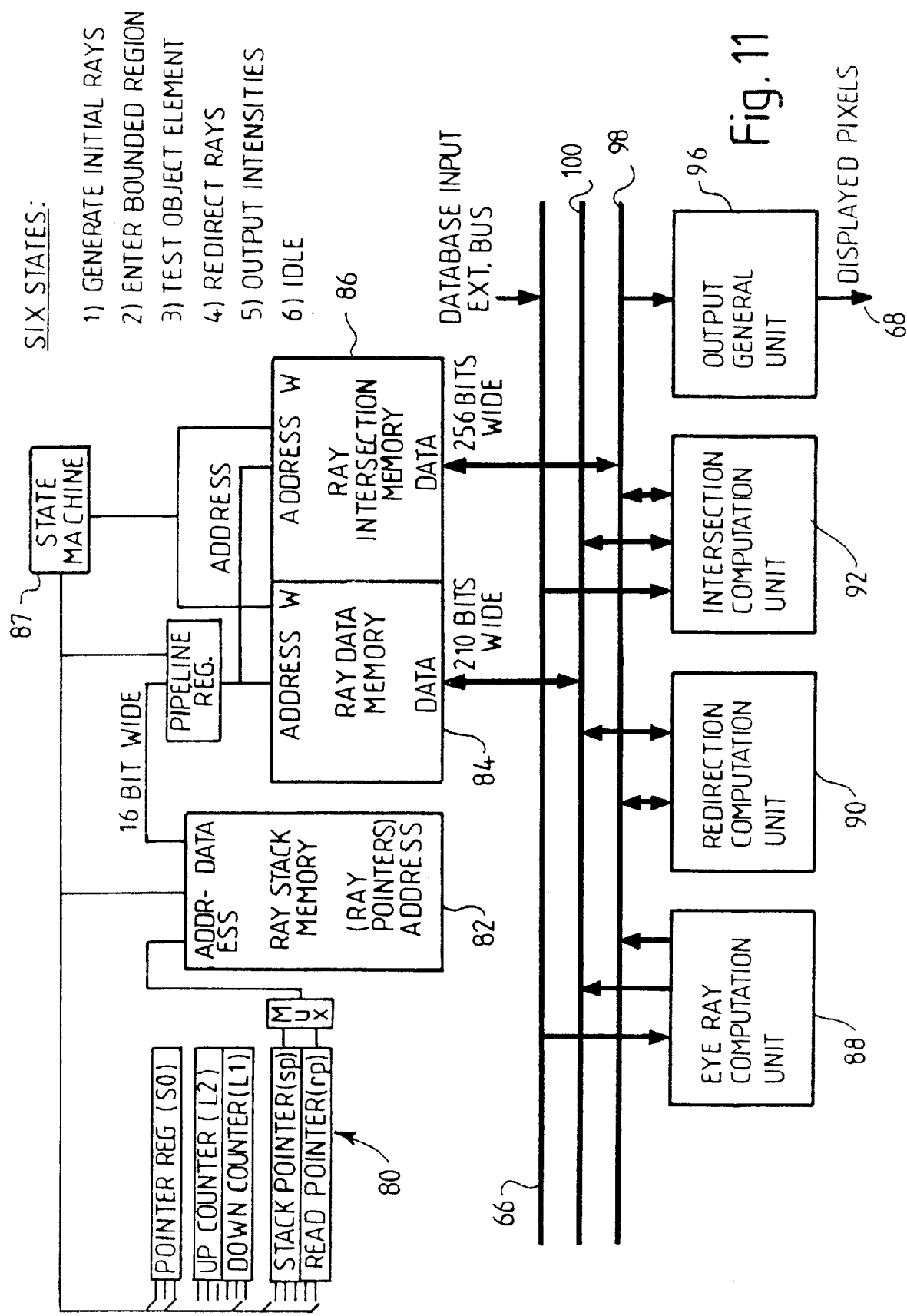
FIG. 11 is a block diagram illustrating the architecture of the chip shown in FIG. 10.

With reference to FIGS. 10 and 11, each ray tracing processor unit comprises a VLSI (Very Large Scale Integration) integrated silicon chip 78 having the architecture illustrated in FIG. 11. Thus, the chip 78 includes various registers counters and memory stacks 80 connected to a ray stack memory 82, a ray data memory 84 and a ray intersection memory 86. The memories 84 and 86 exchange information with an eye ray computation unit 88, a redirection computation unit 90, an intersection computation unit 92 and an output generation unit 96, all of which are connected to the memories 84 and 86 by bus connectors 98 and 100. The units 88 and 92 are also connected at bus connector 66.

Figure 12:
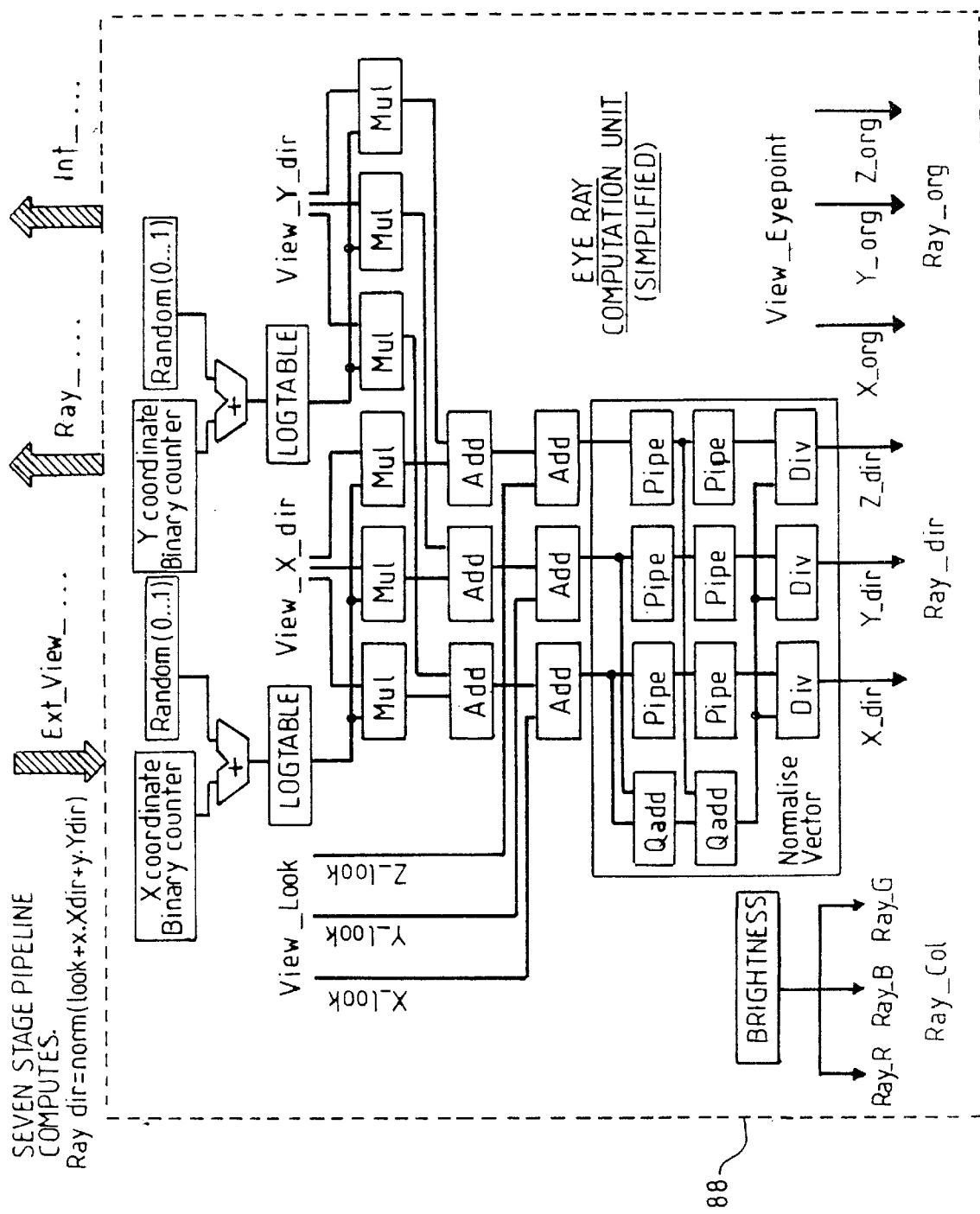
FIGS. 12–15 are more detailed block diagrams of a number of the components represented in FIG. 11.
Figure 16:
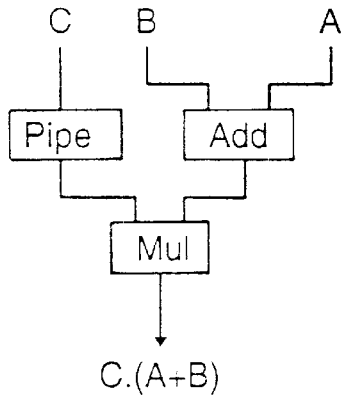
FIG. 16 is a key for the function of the components represented in FIGS. 12–15.

The eye ray computation unit 88 is shown in FIG. 12, and is used to initialise the memory 86 with all the paths which are to be generated. The unit 88 also determines the cartesian co-ordinates for each path and to that end uses logarithmic multiplication, addition, division and subtraction units. The functions of the logarithmic units are set out in the key provided in FIG. 16. The unit 88 then feeds the co-ordinates of each path to the memory 84. Data regarding the co-ordinates and characteristics of surfaces in the scene and of bounding envelopes are also supplied to the memory 84 via the bus 66 and the unit 88. The memory 84 thus contains the data necessary for the subsequent processes carried out by the processor unit.

Figure 13:
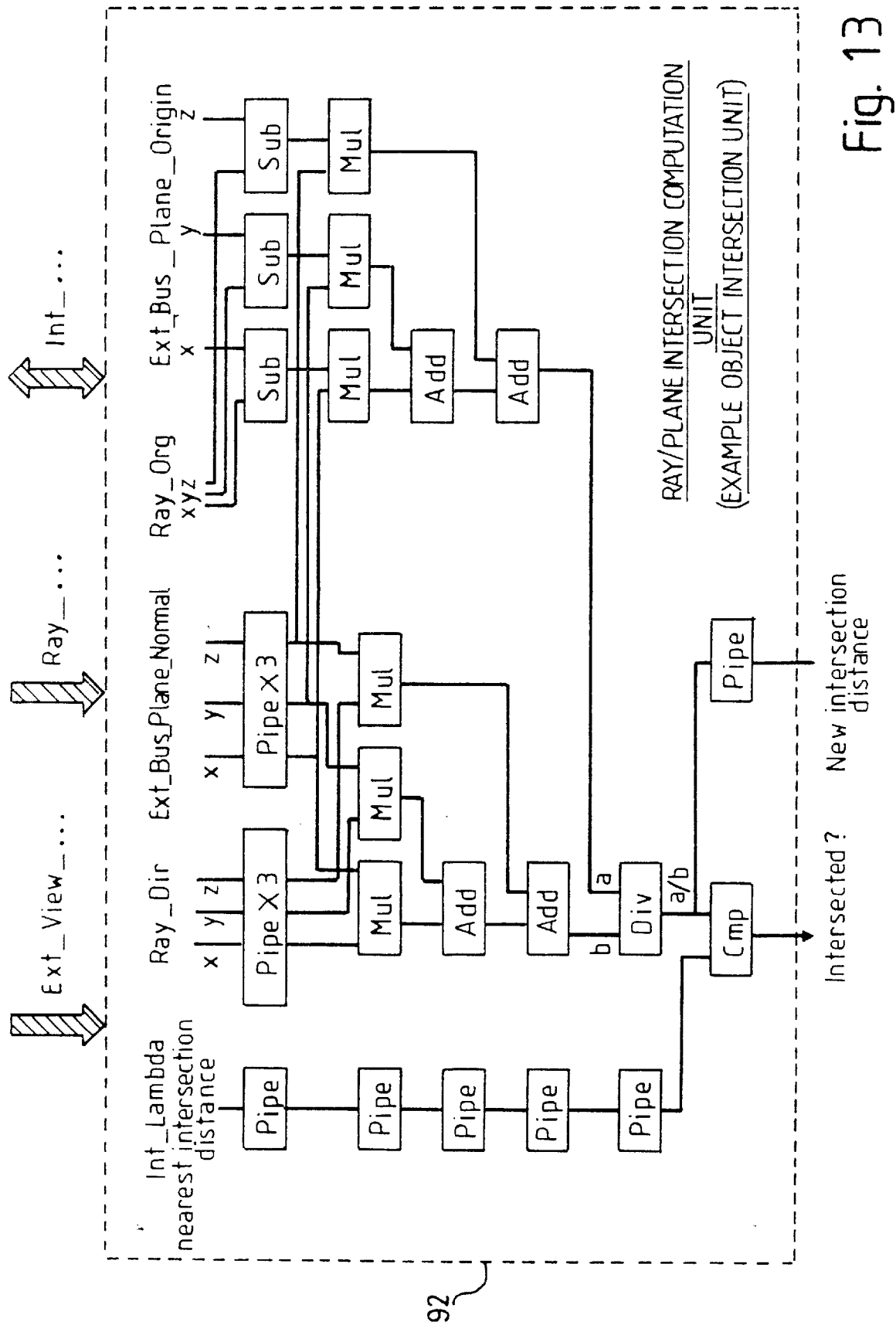

FIG. 13 shows the intersection computation unit 92 in more detail. This unit determines all the intersections of each path with the bounding volumes (i.e. envelopes) and surfaces in the scene to be depicted, and also uses logarithmic arithmetic to that end. Subsequently, the intersections with object surfaces other than an intersection with an object surface closest to the origin of the vector are disregarded.

The unit 92 obtains the necessary co-ordinate data on the paths and the object surface or bounding envelope surfaces from the memory 84, and stores the nearest intersection co-ordinate for an intersection with an object surface in the memory 86, along with data on the optical characteristics of an object surface at that intersection.

The paths, co-ordinates of which are stored in the memory 84, are identified by means of addresses which are allocated by the unit 80. When a given path is found by the intersection computation unit to intersect a bounding envelope, the address for that path is stored in the ray stack memory 82, which thus compiles a list of paths which intersect that envelope. The ray stack memory stores those addresses at successive memory locations, so that those addresses are subsequently read back in order. When the objects in that envelope are rendered, those addresses are read back from the ray stack memory 82 and used to index the memories 84 and 86.

Thus only the paths which intersected the boundary envelope are considered in relation to the surfaces therein. The ray stack memory 82 stores several address lists at once, the lists being stored contiguously. This enables the hierarchical use of object envelopes as previously discussed.

The operation of the various units of the processor shown in FIG. 11 is controlled by a state machine 87, which generates a sequence of control signals for those units. That sequence is determined by the predetermined sequence of operations to be carried out by the processor so that each unit and each of the buses is activated at the appropriate times.

Once all the primary paths have been tested for intersection with a given surface, data on another surface is broadcast to the processor, thereby updating the memory 84, and the process described above is repeated, until all the primary paths have been tested for intersections with all the object surfaces and sources of illumination in the scene.

Figure 14:
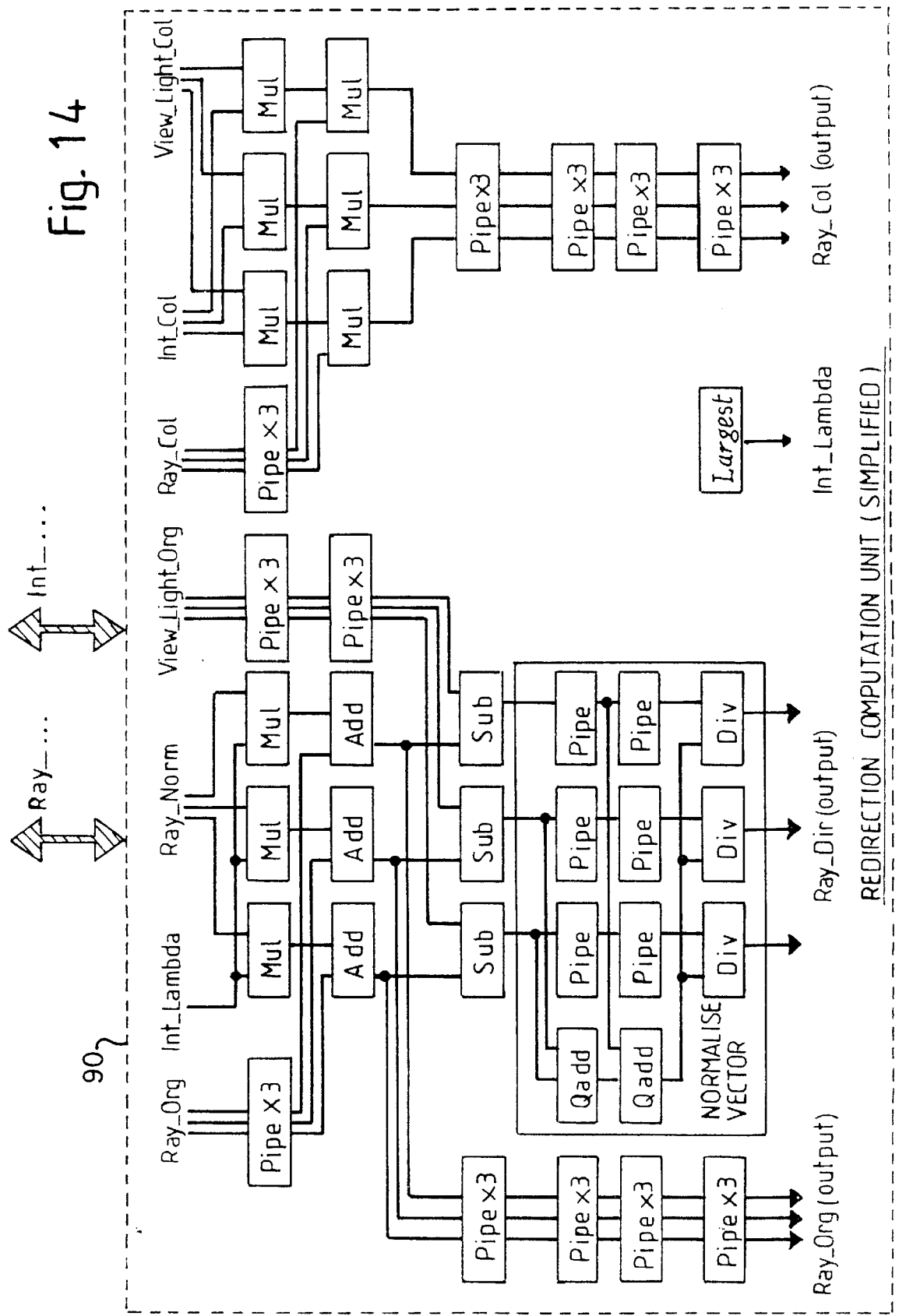

An example redirection unit 90 is shown in more detail in FIG. 14. Once the database has been compared with all the primary paths, and data on the nearest intersection for each path which intersect an object surface stored in memory 86, this unit generates further secondary paths, by means of logarithmic arithmetic. For each such path, unit 90 accepts data on the co-ordinates and surface characteristics of the nearest intersection of that path from that memory 86 and generates secondary paths accordingly. The co-ordinates of the secondary path are stored in memory 84. The secondary paths are then tested for intersections with boundary envelopes and object surfaces in a similar fashion to the intersection tests performed on the primary path. In subsequent passes of the database tertiary rays may be formed from secondary paths in a similar fashion and so forth. More complex redirection units are required to send paths to multiple light sources and in specular, diffuse and refracted directions.

In a modified form of the apparatus, for each intersection detected by the unit 92 for a given path, unit 90 generates further redirected paths. If the intersection is found to be closer to the path origin than any previous intersections of the path, then the redirected paths are written into the intersection memory 86 otherwise the paths are discarded. This involves unnecessary computation as paths are redirected and then sometimes discarded, however, no surface data need be stored in the memory 86. After all the primary paths have been tested against the database, the secondary paths are copied from the memory 86 into the memory 84. In subsequent passes of the database, tertiary rays may be formed from secondary rays and so forth.

Figure 15:
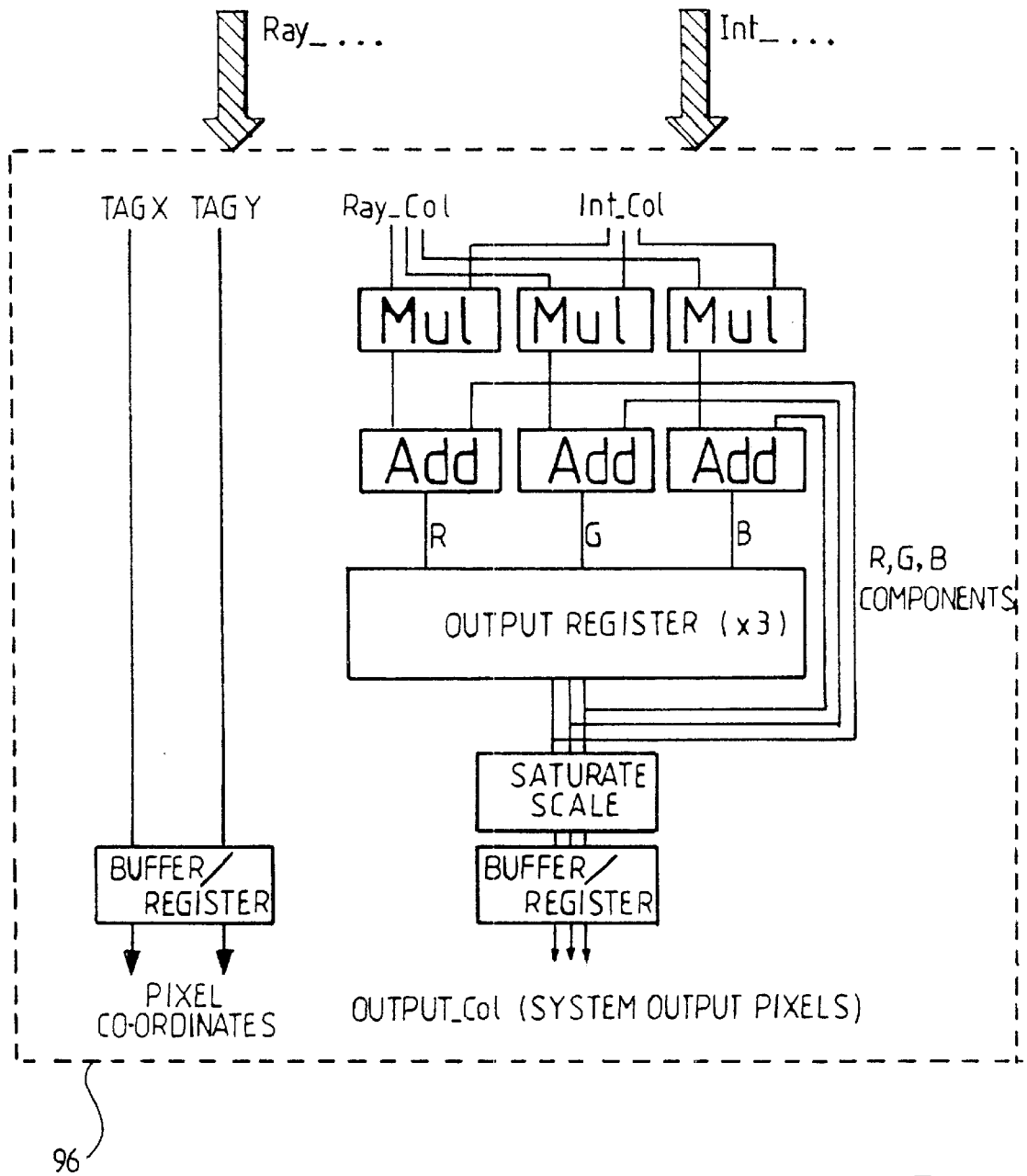

FIG. 15 shows the output generation unit 96 in more detail. This unit converts the intersection information in the ray memory into pixel intensities and colours, and generates an output signal representative thereof.

The output signal is fed along the bus connector 68 to the video output 72 where it is incorporated into the video signal for the display 76. The intensity value for each pixel has three colour components, red green and blue, which when combined also define the colour of the pixel.

In use, each ray tracing processor unit calculates the required output for a group of pixels allocated to that unit, and the ray tracing processor units determine intersections with each object simultaneously.

The processor unit provides what is known as pipeline of operating processes. This means that the unit performs different processes on different straight line paths simultaneously.

Thus, for example, while the redirection computation unit 90 is generating secondary paths at the intersection of a primary path with a surface, the intersection computation unit 92 is testing the next primary path generated by the eye ray computation unit 88, while the unit 88 generates a third primary path.

Further details of the method of the apparatus are discussed below.

In order to test for intersection, the primary path origin and direction are calculated and this information is used to determine the ray intersection distance for the nearest intersection. The surface properties of the object at the intersection are stored with the distance in case that intersection turns out to be the nearest after testing all objects. Secondary paths must be handled in a second pass of the database, while further passes can be used to handle ray trees of any depth. Having completed all passes desired, the colour of the eye rays (i.e. of light travelling along the primary path) can be output to a display device.

In the present method the database is broadcast just once (for each set of paths), and the paths for all the rays in the image are traced together, rather than completing the path of one ray before starting the next. Each level of reflection or refraction requires another pass of the database as further sets of vectors are generated. The broadcast databus is thus used very efficiently, with each element broadcast a fixed (small) number of times (equal to the number of levels the rays are traced), independent of rays in the scene.

The video output port of the apparatus 60 carries image data at video rates and is connected to the 512-bit bus 68. The database and control port could be connected to either the 512 bit-bus 68 or the 128 bit-bus 66, but the data on this port is likely to be of a non-sequential nature, and the bandwidth required is smaller (this will not be so in the unlikely event that more than 8 MBytes of database are visible on a 2 MPixel display).

A bounding volume (eg envelope 46) is transmitted on the broadcast bus 66 before the objects contained within. In this manner, the object tests can be performed only on rays entering the bounding volume.

In order to render the whole image with just one access of each primitive of the database, the whole image is rendered simultaneously, and not pixel by pixel (which would require multiple accesses of each element in the database). The internal state of the ray tracing hardware therefore contains the state of the whole image as it is rendered element by element. The effect is that of swapping the inner and outer loops present in most simple software ray tracers (FIGS. 3 and 4).

In order to render the whole image at once the renderer's memory 70 holds the colour of every pixel (i.e. ray) at once, and also holds any state which is referenced by that ray during the course of the computation.

Bounding volumes are allowed to contain both objects and further bounding volumes, creating a hierarchy. The number of intersection tests performed then becomes logarithmic as a function of database size, rather than linear as in the non-hierarchical case. This allows large databases to be rendered—in fact for very large databases where most objects are obscured, the rendering time becomes virtually independent of database size.

The use of a hierarchical arrangement of bounding volumes (FIG. 6) involves structuring the database as a tree in which the visible objects correspond to leaf nodes and the parent nodes contain non-visible bounding spheres, circumscribing all the corresponding leaf nodes. The root node for the whole tree thus specifies a sphere enscribing the whole database—the "world sphere".

The rendering operation becomes traversal of the tree, and involves broadcasting first of all the world sphere (origin and radius), and then the daughter nodes recursively until all leaf nodes have been broadcast. The traversal is performed in a depth-first manner.

Optimisation is achieved by making use of the bounding sphere information in deciding which rays to consider further. Each ray vector stored can be tested for intersection with the currently broadcast bounding sphere by a simple vector arithmetic test. If a ray vector fails to intersect a bounding sphere, it cannot possibly intersect any of the leaf nodes further down this branch of the tree. The paths that fail the intersection test need not be considered again until the search leaves this section of the tree. The number of intersection test is thus considerably reduced. The overall efficiency of the method depends on the branching factor of the tree and its depth, as well as the projected areas of the bounding spheres. The smaller the projected area of the bounding sphere at the ray origin, the more likely it is to be missed and eliminate unnecessary bounding sphere-ray and object ray tests. If all rays have missed a bounding sphere, then the broadcast of nodes further down the tree is not necessary (that part of the database has no effect on the final image). The broadcast can jump to the next tree node for which some intersections are still possible.

The rendering process begins by initialising the ray memory on each ray tracing processor. In the simple case of no antialiasing, each pixel produces one eye ray. The ray memory holds the structure (described earlier) with the origin being the camera position, the directions derived from the pixel position and viewing direction, and the distance value set to "infinity" (the largest representable number).

The host processor 74 (i.e. the broadcasting agent) then broadcasts the bounding sphere corresponding to the root node of the database. All rays are then checked for intersection against this sphere. The rays that have nearer intersections than found so far are placed in a list of (pointers to) rays to consider further. The host then (provided the list is non-empty) moves down the tree to the next level, and broadcasts the next bounding sphere. All rays in the list that intersect are transferred to a new list. The host carries on moving down the tree until a leaf node is met or the current list becomes empty. When that happens, the current ray list is dropped (the previous list becomes the current), and the host broadcasts the next untransmitted node up the tree and tests that against the (new) current ray list. This depth first search is continued until the whole tree has been traversed, at which point all the ray lists have been discarded. The first level ray intersections have now been found.

The host determines when all the current ray lists in the renderers become empty. This is achieved by a signal indicating if the current list is non-empty which is output by each renderer chip, and ORed externally (using a wired-OR arrangement). In this way, the host can determine if any processor needs the current bounding volume expanded or not.

The process of shading and secondary path generation (known here as ray redirection) can now take place. All rays have their colour set according to the colour and other surface characteristics of the intersection stored with the associated paths. If there is only one path produced at the intersection, that new path's information can be stored in the same memory location as its parent path. If more than one path is produced, the data must be stored in further memory locations, all corresponding to the same screen pixel. At the end of the rendering process, the pixel intensity is computed as the sum of all paths derived from that pixel. All these shading operations can take place without reference to the database, provided that the appropriate data has been stored for each ray. The broadcasting agent need take no further action until ray vector redirection has been completed.

The secondary paths can now be traced. The host processor follows the same steps as before, starting the database search from the root node again. It is likely at this stage that more of the database is accessed as the paths are now going in a wider range of directions (the primary paths have a limited range of directions). Once the database traversal has been completed, another shading process can take place. Shadow paths, the paths which have failed to reach the light source are set to black. Further reflected, refracted and shadow paths may be generated by ray redirection as before.

Rendering can continue level by level until a defined limit, or until there are no rays left to be traced (weak rays could be discarded during the shading phase). When the final shading has been completed, the output stage can take place. All rays have their final intensities added to the output image (initially set to black). Where a ray has been split (say into a reflected and a refracted component), the final pixel contains the light from each path as required by the ray tracing algorithm. The algorithm executed by the host processor is illustrated in FIG. 4.

Simply traversing each daughter branch of a node in arbitrary order means that often, more distant bounding volumes will be searched before the nearer volumes. Ideally, for each ray, the nearer bounding volumes will be searched before further bounding volumes. In this way, if an intersection has been found that is nearer than the nearest possible intersection point in a further bounding volume, then that further bounding volume can be rejected as no nearer intersection could be found in it. The bounding volumes behind the ray origin could also be trivially rejected. Unfortunately, the broadcast database algorithm prevents the optimal method. This is because there is only one tree search order which is used for every vector considered, and different vectors are likely to need different traversal orders for optimality. One way of improving the search order is as follows:

1) Move to the root node of the tree.

2) Expand the node to give the daughter nodes (probably bounding spheres).

For primary paths only:

3) Test each bounding volume for intersection with the viewing frustum, and reject bounding volumes completely outside the viewing frustum (this step is optional).

4) Sort the nodes into order based on distance to camera (nearest first).

5) For each node in order, broadcast the node (bounding sphere or object) and go to step 2 (recursively) if the node was a bounding sphere.

By using the algorithm, fewer unnecessary bounding volume and object tests are done than in the simple tree-traversal case. The exact improvement achieved is highly scene dependant. For example, where a view from inside a room is being rendered, the room node is expanded before any objects outside the room are considered. In this manner, most of the database relating to the outside of the room is ignored.

For the simple case of ray casting (in which only primary paths are generated), only the eye rays are considered, so any part of the database outside the viewing frustum is ignored.

The algorithm described above requires creation and maintenance of several lists of rays. The method for doing this is described below.

Every path in the system is represented by its address in ray memory. When a path has entered a bounding sphere, the address is pushed onto a stack 80. Once all the active paths have been considered, the new list of active paths is given by the list of paths just pushed onto the stack. A linking pointer is pushed onto the stack so that when the list is discarded, the stack pointer can be moved to the previous list.

This method of manipulating the active lists has been found to be effective, and is readily implemented in hardware, requiring a single RAM, a pointer register (for the next link pointer), and a loadable up-counter (for the stack pointer). It is interesting to note that the memory access pattern is very simple, requiring more frequent access to locations nearer the top. A hardware cacheing scheme could be devised to provide a large memory for both the pointer list described here, and the actual ray data. This would enable rendering of large pixel arrays by using large relatively slow memories for the ray data and pointers without affecting overall cycle time. Such specific cacheing schemes are in use for stack based microprocessors (such as the Harris RTX 2000 (Harris 1990).

The intensity and colour for each pixel in the output image is determined by computing a weighted sum of point samples in all the dimensions considered. The primary paths are determined from the view geometry and the output pixel grid in the usual way, but with offsets added to the pixel coordinates X and Y values for antialising, and to the viewing position for depth of field. The paths are also timestamped with an offset from the notional frame time if a moving sequence of frames is being calculated.

Figure 17:
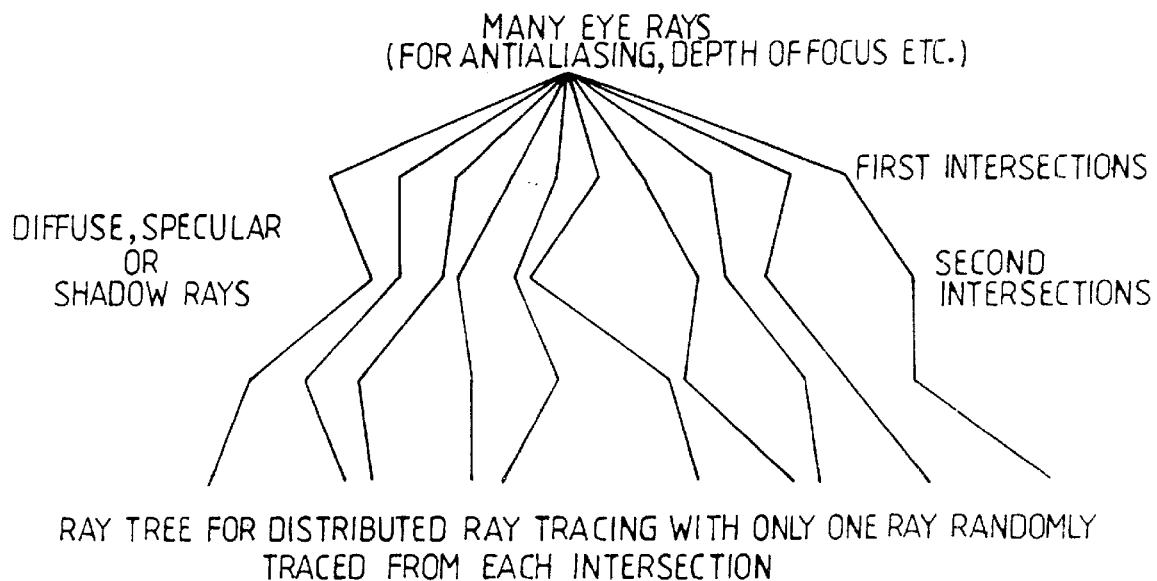
FIG. 17 shows a ray tree diagram relating to a method having a preferred feature of the invention.

The primary paths are traced to the first intersection, at which point a single diffuse path is generated emanating from the intersection point in a random direction leaving the surface or a refracted path is generated or a specular ray is generated. The diffuse direction may be uniformly distributed over a hemisphere, and the ray intensity value multiplied by a factor determined from the intersection geometry (incoming and outgoing directions, surface type and normal), or a special distribution can be selected giving higher probability in the directions with higher diffuse intensity. This secondary path is then traced to the next intersection where the same process occurs. Ultimately almost every ray path (i.e. path defined by a primary path and the subsequent set of path(s) associated with the primary path) will hit a light source of finite intensity, resulting in a contribution to the corresponding pixel intensity, or will diverge to infinity or hit an infinitesimal light source, making no intensity contribution. The ray defined by the paths is tested against the database corresponding to the time offset stored with the associated vectors. The resulting ray tree is shown in FIG. 17.

The ray's final intensity is considered to be an estimate of the true intensity of the pixel concerned, but will normally be highly inaccurate as only a single path to the light has been used rather than all the possible paths, and the ray vector may be on the edge of a large intensity change. By accumulating data from many such vectors, a good estimate of the true intensity can be obtained, taking into account the effects of sampling in all the dimensions concerned. Each sample taken requires just one ray vector to be considered at each level of reflection, resulting in a considerable simplification of memory handling. It is no longer necessary to store any of the ray tree in memory, it is sufficient to compute a running product of the reflectivity at each level—in effect the branching ray tree has become a simple (i.e. non-branching) list of intersections. Ray propagation can be terminated when a path enters a light source (they must have finite area), or can be arbitrarily cut off according to some criterion as in normal ray tracing. In this case an ambient value could be used, or black could be used, indicating no light follows this particular path.

Logarithmic Arithmetic

The format used in the simulations and in the discussion here is a 20 bit log representation of the base 2 logarithm, with binary point such that log values from −32.0000 to +31.99988 are represented. The sign of the number is maintained in the remaining bit (bit 0). All numbers between about $-4 \times 10^9$ and $4 \times 10^9$ can be represented to just under five significant figures, except for a small jump around zero. To reduce the number of special cases a simple format is used, and an exact zero and infinities are unnecessary. There have been no artifacts observed by the lack of a zero, and where the maths requires it, the smallest positive number is used (called "smallest" here).

Various scalar operations have the following implementations in this form of arithmetic:

| | |
|---|---|
| Multiply | Add the logs (in two's complement) Saturate if overflow occurs, XOR sign bits. |
| Addition: | |
| when signs match: | result is: larger + f (larger−smaller) where $f(x) = \log(1 + 2^{-x})$ |
| when signs differ: | as above but $f(x) = \log(1 - 2^{-x})$ |
| Subtract | Invert sign bit and use addition procedure |
| Square | Arithmetic Shift Left, saturate on overflow, sign bit = 0 |
| Square root | Arithmetic Shift Right, give error if sign bit = 1 |
| Divide | Subtract logs, saturate if overflow, XOR sign bits |
| Reciprocal | Two's complement |
| Compare | If signs are different, the positive one is larger If signs are same, compare the magnitude of the logs | note: saturate means return (smallest) or (largest), depending on overflow direction.

Another operation is introduced at this stage, the quadrature add (Qadd). This operation returns $\sqrt{x^2+y^2}$, and is useful for computing vector lengths, which evaluate to X Qadd Y Qadd Z. The advantage of introducing this operation is that the intermediate $(x^2+y^2)$ is never represented and so the operation cannot cause overflow unless the result overflows. Evaluating the expression directly would require an extra bit to be introduced, and would be represented by four function units. The direct implementation can use the same method as simple addition, but without the considerable overhead of handling negative numbers, as the inputs to the adder will always be positive.

It is worth noting that the comparison is also implemented as a special function unit, as an efficient algorithm is simply to compare the log representations, and invert the result if both numbers are negative.

All the common operations except addition and subtraction are seen to be simplified over a floating point representation, and the addition requires $\log(1+2^{-x})$ to be determined. This function (known as Gauss' Logarithm) quickly falls to zero as x becomes large (x is always positive), and could be implemented by tabulation (with or without interpolation) or by a small multi-stage logic network perhaps determined by logic optimisation software. A compact implementation here would allow a very large number of function units to be placed on even a modest size VLSI component.

The multipliers and dividers can be implemented with simple pipelined adders or subtractors, checking for overflow.

The last block used in the block circuit (FIGS. 12–15) diagrams is the empty pipeline stage. This simply delays a signal by one clock cycle, aligning stages in time so that they compute on corresponding data. The implementation is simply as static or dynamic latches, according to the technology used.

The spatial coordinates in the database are represented by cartesian triplets (x,y,z). These coordinate values must be held to at least the precision corresponding to one pixel on the screen (so that surfaces may be faceted), and preferably higher (for antialising and calculation intermediates). The range is sufficient to handle the range of distances held in the database or required for intermediates.

The representation requirements of direction vectors (such as surface normals) are slightly different from those of spatial coordinates. Because the length is always unity, the value of any coordinate can never exceed one, and the range requirement is relaxed. Ideally, the error in the representation should be roughly constant, independent of direction. There is thus no benefit in representing very small numbers accurately. As before, the vector direction is held to an angular accuracy that corresponds at least to the angular resolution of the eye. The fractional part of the log must therefore have 11 bits. The range requirement means that the log must hold numbers from −10 to 0, needing four bits. The complete representation is therefore 16 bits (including the value sign), as before but missing the sign of the logarithm (the log is always negative).

Representing the colour components is sufficient to provide enough resolution to give negligible additional noise to the image. Here the logarithmic representation is particularly effective, as the eye can resolve intensity changes down to a certain percentage change. Display circuitry such as the Cambridge Advanced Framestore display eight bits of intensity precision. Input representation of object colours need not improve on this, as visible effects would only be observed if a variation was enough to change the output by at least one quantum. Internal computations take place to at least this resolution to prevent noticeable degradation. The range of the representation is able to hold intensities at least from at least the dimmest to the brightness output required (i.e. from 0 to 255 in the output buffer). The displays used by the author give approximately double the intensity for a change of 64 in the framestore (this may be seen by observing a striped pattern with the values 0 and 164, which is about as bright as a uniform intensity of 100). The result of this is that the log (base two) of the actual intensity value runs from about (say) 0 to 4 with 256 steps, that is a logarithmic number system representation with two bits to the left of the binary point and six to the right. These eight bits can be written to the display. If necessary, higher precision and range could be achieved simply by adding bits on the right or left respectively.

The method for interlinking the logarithmic maths units is simply via clocked latches. On each clock pulse, new data may be entered into the latches on the input side of a computation unit, while previous data are advanced a stage. Where the computation requires data from a stage before the previous stage, extra latches can be inserted, holding the data up for a known number of cycles. The computational latency is thus constant and given by the number of stages.

The main internal blocks present in the ray tracer are shown in FIG. 11. The data structures given above are represented directly on wide data buses running through the system. The various computation units and memories are connected to the buses, and bus timing and control functions are provided by a simple state machine.

The eye ray computation unit 88 is responsible for initialising the ray/intersection memory with all the primary paths that are to be traced. This requires initialisation with the viewing specification, the number of pixels, the number of distributed rays, and so on.

The ray intersection unit 92 is the system component responsible for determining the distance(s) (intersection lambda parameter) for the path passed on the internal bus with the externally applied data representing either a bounding sphere or a primitive element type.

The redirection computation unit 90 generates the new paths for the next level of ray tracing. It does this by scanning sequentially through each path in the ray memory 84, and moving the origin to any intersection point found. The path's direction is calculated from the associated intersection data.

The output generation unit 68 is the interface between the ray/ray intersection memory and the external system. The data rate necessary suggested a single pixel wide path would be adequate to external circuitry, provided fairly high clock rates can be supported.

The ray memory is initialised with data generated by the unit 88. The external interface specifies viewing parameters for the viewing eye point, look direction and screen x and y directions, all as cartesian 3-vectors. The interface also supplies the maximum values of the x screen coordinate and the y screen coordinate, together with the number of primary paths to generate for each pixel. These are the values which are loaded into the various counters allowing the requisite number of paths to be generated. In a system with multiple units, the host processor can address (via a simple enable line) each interface individually. In this way different ray tracing processors can handle different viewing conditions, perhaps different pixels, screen areas or viewpoints. The initial ray intensity (brightness) for each primary path is also loaded.

Having loaded the specification for the view to be rendered, the unit 88 can generate all the vectors necessary in rapid sequence and write the resulting ray specifications into the ray memory. The unit 88 consists of a seven stage pipeline, so the memory writes are delayed by seven cycles to ensure the vectors written to the correct locations. If the vector memory is external to the chip, the rate will be limited by the cycle time of the memories and perhaps by the interface width (the chip may multiplex external data lines, necessitating several transfers per ray). The ray memory intersection structure is initialised by setting lambda (the intersection distance) to the maximum representable number and the intersection surface colour to (0,0,0). A typical render for a 576×768 pixel screen would generate about 2 000 000 primary paths assuming about five samples per pixel. The initialisation time (0.02 s) for this would thus be under a frame time (assuming a 100 MHz internal operation rate, high, but plausible for a sub-micron CMOS process).

The ray tracer state machine then initialises the ray stack memory 82, and the next stage of rendering can proceed.

Ray intersection unit—internal details

Once the initialisation has taken place, the host begins broadcasting the database tree, element by element, from the root node in a depth-first manner. The ray intersection unit 92 reads the path specifications from the ray memory and tests the element broadcast by the host for intersection, producing the new intersection lambda and surface normal values. These values are stored in the ray memory if an object hit is found.

The unit 92 reads the primitive type and interprets the broadcast data as one of the structures described above. In the case of the bounding sphere, the maths is simply a vector cross product squared applied to the path and the vector joining the path origin and the sphere origin (i.e. the vector difference). The value is compared to the sphere's radius. If the bounding sphere is intersected, the (nearer) intersection distance is compared with that stored with the path. The intersection unit sends a signal to the state machine if the intersection is nearer, indicating a possible object hit for objects contained within the bounding sphere. This signal causes the path (pointer) to be stacked ready for the information on the contents of the bounding sphere to be broadcast (i.e. the database tree further down this branch). The processor can now output a signal (bounding volume expansion request) indicating the host should continue searching down the tree because there are some paths entering that section of the database.

In the case of an object plane being broadcast, the intersection test is simple, requiring a dot product between the surface normal and plane of the path displacement vector. The distance is compared with the distance stored with the other intersections of the path. If the new intersection is nearer (but still positive), the ray intersection unit indicates that an intersection has been found and the new intersection data are to be stored in place of the old data stored with the path.

Once the ray database has been compared against all paths, the intersections stored with each path now represent the actual physical intersections that the path made. If further tracing is required for a given path (for secondary, tertiary paths etc), each of the further paths may now be directed by a process of reflection or refraction, or the given path may be dropped because a ray defined thereby has an insignificant intensity or because the path hits no object. If no further tracing is required, the ray memory may be scanned to generate the output pixels. The purpose of the redirection unit 90 is to compute the new path origin, intensity and direction according to the information stored in the ray memory. The process consists of a six stage pipeline.

The new path origin is simply the old path origin plus lambda units along the direction of the latter. The new ray colour is the old colour multiplied by the colour that the surface applies. The colour applied by the surface could simply be the surface's diffuse colour, but a more realistic system could be devised at the expense of extra silicon.

The new path direction depends on whether a reflected, refracted, diffuse or shadow ray is to be generated. If the simplifications described above are used, there are no shadow rays, and all illumination is by area light sources. The concept of specular and diffuse reflections are combined by adding a random displacement onto the specular direction of a magnitude dependant on the surface specular coefficient. These simplifications result in requiring just two types of redirection: reflection and refraction.

The process requires reading each ray memory location, and writing it a number of clock cycles later. The complete scan will take twice as long as the initialisation process performed by the eye ray computation unit, or, in the 576×768, 5 time supersampled case about 0.04 seconds. The redirection is required between primary and secondary ray rendering, and once more for each further level. In the case of three levels of ray propagation (two reflections) the redirection adds about 0.08 seconds to the rendering time.

The output unit 68 converts the intersection information in the ray memory into pixel intensities. The unit counts sequentially through the memory, multiplying the ray intensity by the intersection intensity producing the intensity contribution for the ray path to the output pixel. These contributions are summed in a accumulator (still using logarithmic arithmetic) until all the rays for that pixel have been included, and then outputs the intensities in RGB format to an external interface. The conversion to RGB format is simply by taking the middle eight bits of the log representation. Numbers less than 1 cause zero to be output—either the log of the number is less than zero giving the MSB set, or the value sign bit is set indicating negative intensity (which should not happen if all object have positive intensity). Values exceeding the output range (256 or more) cause 255 to be output. The choice of which bits are used determines the output gamma.

The time to output the completed image from the ray tracing unit is given by the slower of the ray memory time and the interface time. For high supersampling factors, the ray memory must be cycled many times for each output RGB value, and its cycle time will dominate.

The apparatus 60 begins by initialising all the eye rays in the scene. Each renderer chip holds a fraction of the total number of rays. When the first bounding volume is processed, the renderer chips will finish simultaneously—it takes two clock cycles to test each ray, and the number of rays considered by each chip is the same. The subsequent bounding volumes broadcast will take shorter and shorter times to test, as the number of rays considered by each processor shrinks. The processors that finish earlier cannot continue processing until all the rays have been tested by every chip. The architecture will therefore suffer an inefficiency, if the number of rays handled by each chip at any level becomes too varied. The likelihood of this happening depends on the number of chips, the number of rays, and their distribution within the scene. As the number of processors becomes large, it would be advantageous to perform a similar splitting in the y axis. If necessary it would be possible to process different supersamples of the same pixel in different processors. The primary ray intersections in each processor would be highly correlated, and the number of rays considered by each would be virtually identical. For secondary and subsequent ray passes, the distribution of ray directions becomes more random (especially with diffuse illumination by distributed ray tracing). The problem of load balancing therefore becomes largely independent of the initial ray distribution.

A detailed analysis of the load distribution is complex, and should be considered in the context of real databases, however some idea can be gained by a simple analysis. For the testing of bounding volumes high up the database hierarchy, all processors have about the same load because they start with equal numbers of rays. As the number of rays considered in each processor becomes small, the distribution becomes more unbalanced, but the processing time becomes shorter. Far down the tree, where only a few rays are being processed, the time taken to broadcast the next database element may become comparable to the time to process the element, and the rendering becomes limited by the broadcast rate. Under these circumstances, any effect of processor imbalance is negligible.

In cases where the load balancing becomes a problem, however, a small buffer on each chip could be devised which would enable a certain amount of storage of pre-broadcasting of the database. Processors that finish processing the current element could immediately start on the next element down the hierarchy. This would also even out the timing of the element broadcasting by the host processor.

Some images may contain objects with intricate surface features which may be, for example, a surface pattern, such as a painting, or variations in surface colour, specularity, specular power, refractive index, emissivity or orientation. These features would have to be tested against the straight line paths generated by the processors, but cannot be stored on the memory 84 of a processor because that memory has insufficient capacity to store all the features for a whole surface.

Figure 18:
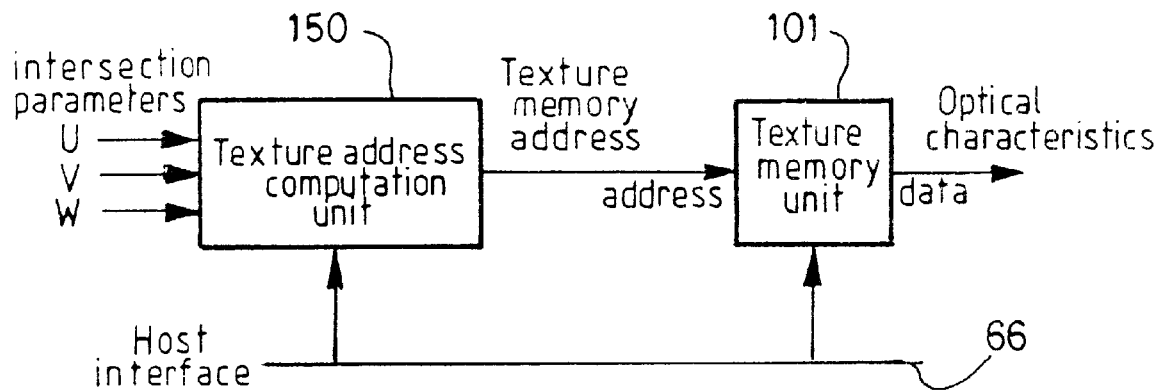
FIG. 18 shows additional apparatus for use with the apparatus shown in FIG. 9.

FIG. 18 shows additional components for each processor, which can be used to store such details in the form of a texture map.

Figure 19:
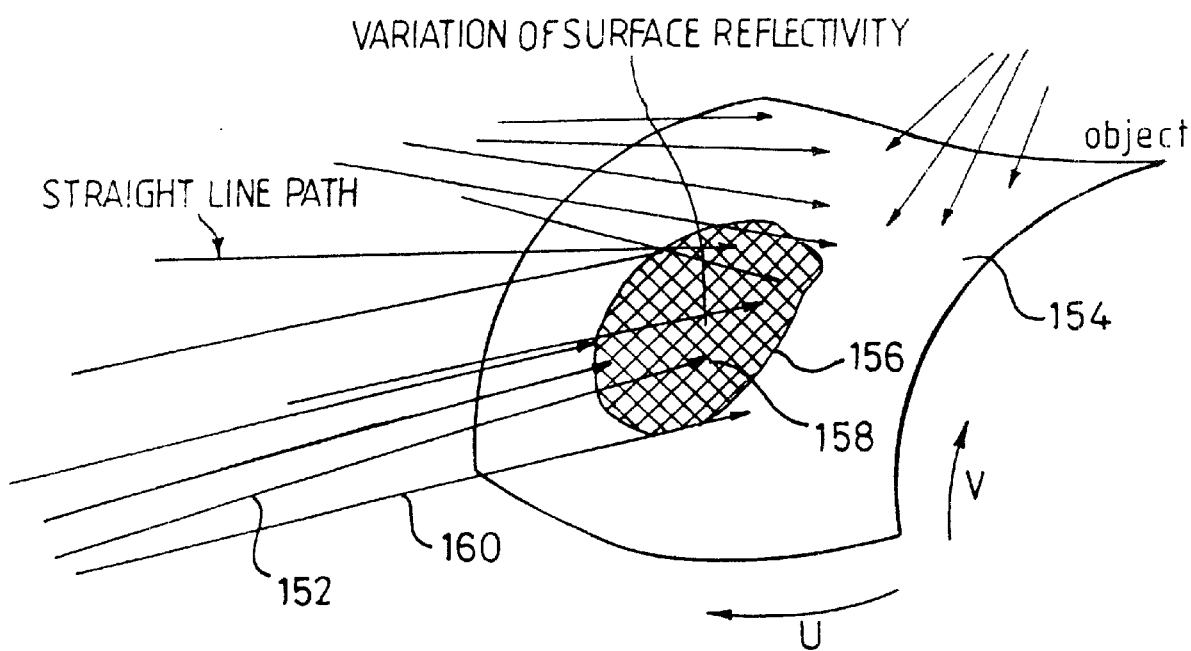
FIG. 19 illustrates, diagrammatically, an example of the data which can be provided by the apparatus shown in FIG. 18.

The components shown in FIG. 18 are incorporated into a modified version of the intersection computation unit 92 shown in FIG. 11, and include a texture address computation unit 150 which is arranged to receive the co-ordinates of an intersection of a straight line path, such as the path 152 of FIG. 19, with a surface 154. Those co-ordinates are represented by the parameters U and V which lie in the plane of the surface 154, which has a region 156, various surface details for which are stored as a texture map in a texture memory unit 101 connected to the address computation unit 150.

The intersection computation unit converts the cartesian co-ordinates of a given intersection into co-ordinates represented by the parameters U and V, prior to supplying them to the unit 50, which then determines whether the intersection lies within the region 156, and if it does, instructs the unit 101 to provide details of the surface 156 at the point of intersection, for example at the point 158. The data which the unit 101 provides for that point of intersection is then used by the intersection computation unit 92 to calculate the effects of those surface characteristics on any light which is directed from said intersection along said path, and by the re-direction computation unit 90 in the generation of further paths. Paths, such as path 160, which do not intersect the region 156 do not cause the unit 101 to generate surface data.

Figure 20:
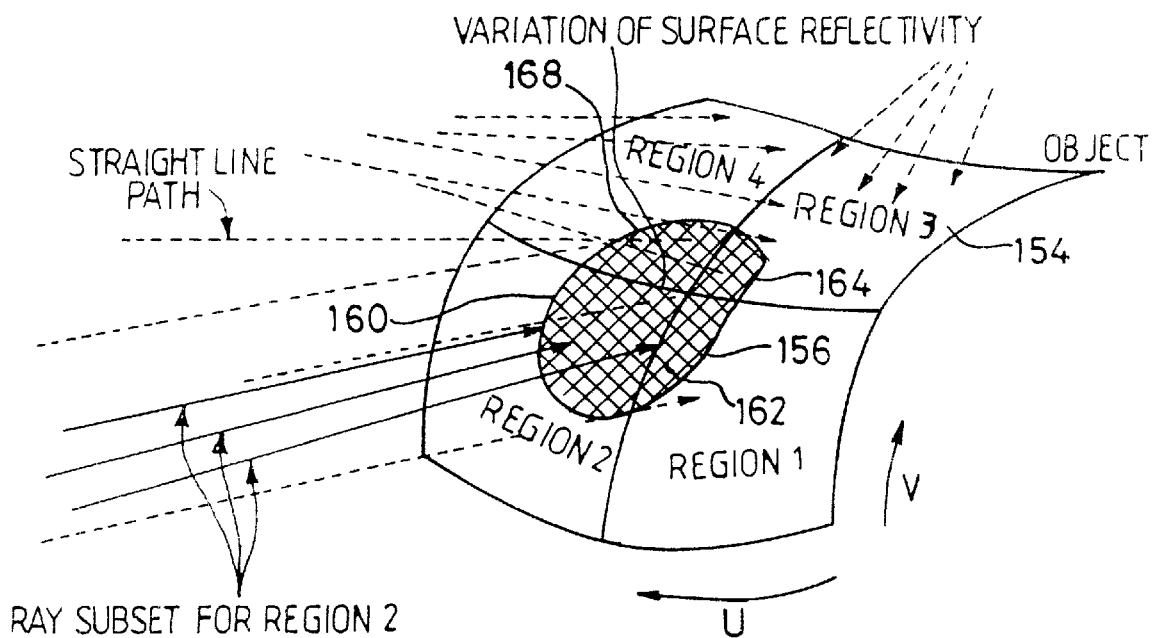
FIGS. 20 and 21 illustrate how the apparatus shown in FIG. 9 uses the data provided by the apparatus shown in FIG. 18.

Once all the intersections of paths with the region 156 have been determined, the units 150 and 101 can be overwritten with data for a further texture map at a different region of the surface 154 or of another surface.

Where the amount of detail on a given region of a surface is too great to be held within the memory 101, the surface can be split into a number of regions, as shown in FIG. 20, in which the details of the region 156 are contained on four texture maps, one in each of the regions 1 to 4. Those texture maps are referenced 160, 162, 164 and 168, and are each loaded into the memory in turn.

In this case, the texture address computation unit conducts two levels of tests on the paths which intersect the surface 154. The first level comprises determining which of the paths which intersect surface 154 does so in a region which contains the texture map currently loaded into the memory unit 101. Those paths which do intersect such a region are then tested to determine which actually intersect the object at the texture map. In this way, the unit 150 reduces the number of tests of intersections needed in relation to the precise co-ordinates of the texture map.

Figure 21:
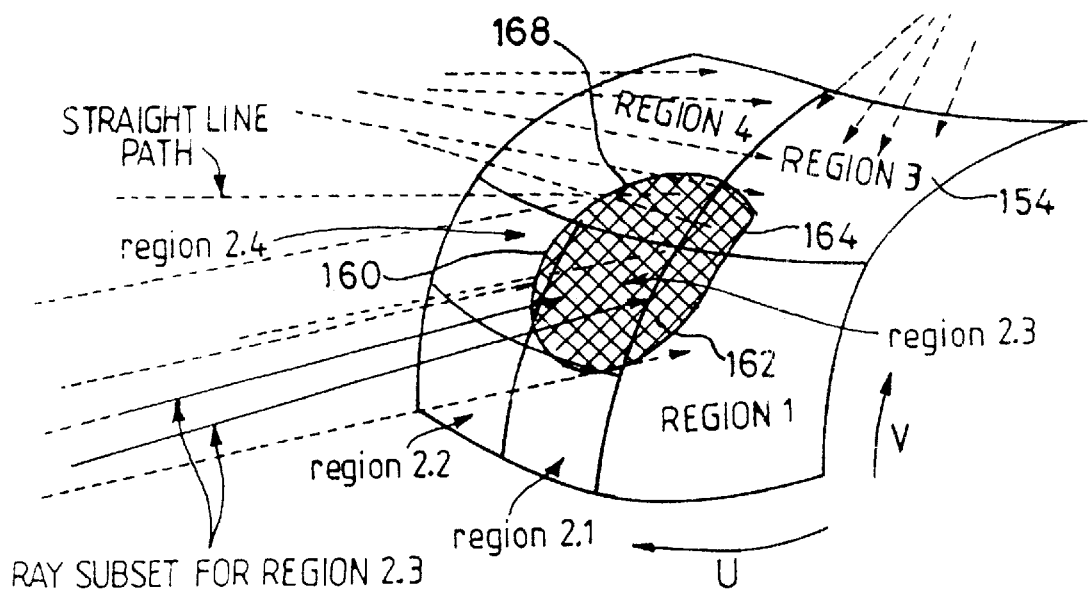

FIG. 21 illustrates a development of this approach, in which each of the regions of the surface 154 is divided into sub-regions, such as region 2.3. In this case, the unit tests the paths on three levels, firstly it determines whether the paths are in a region which contains the texture map in question, and then discards those paths which do not intersect the surface 154 at a sub-region which contains the texture map, thus further reducing the number of paths which have to be considered in relation to the precise co-ordinates of the texture map.

More specifically, the process involves the following steps:

A) Consider the texture data for the entire object to be the current set of optical data.

B) Determine whether the set of straight line paths requiring data from the current set of optical characteristics (i.e. texture data) is empty. If it is, then finish.

C) Determine whether the current set of optical characteristics is small enough to be written into the texture memory unit. If it is, then go to step G, and finish.

D) Choose subsets of the current set of optical characteristics.

E) For each subset (or group of subsets) of optical characteristics in turn, determine the subset (or group of subsets) of the current set of straight line paths which require said subset (or subsets) of optical characteristics for illumination calculations, and start again from step B with this subset (or sub sets) of optical characteristics as the current set of optical characteristics and this subset of straight line paths as the current set of straight line paths.

F) Finish.

G) Write the current set of optical characteristics into the texture memory unit.

H) Perform the illumination calculations on the current set of straight line paths.

I) Finish this set of optical characteristics, and continue with any remaining subsets.

The above method may conveniently be implemented by means of a recursive subroutine on the host processor, which initiates illumination calculations in the herein described image generating apparatus.

When choosing subsets of texture data, it is convenient to split said texture data into four or eight regions delimited by specific ranges of the two, or three parameter values. In this manner a hierarchy of quadrants is chosen.

Figure 22:
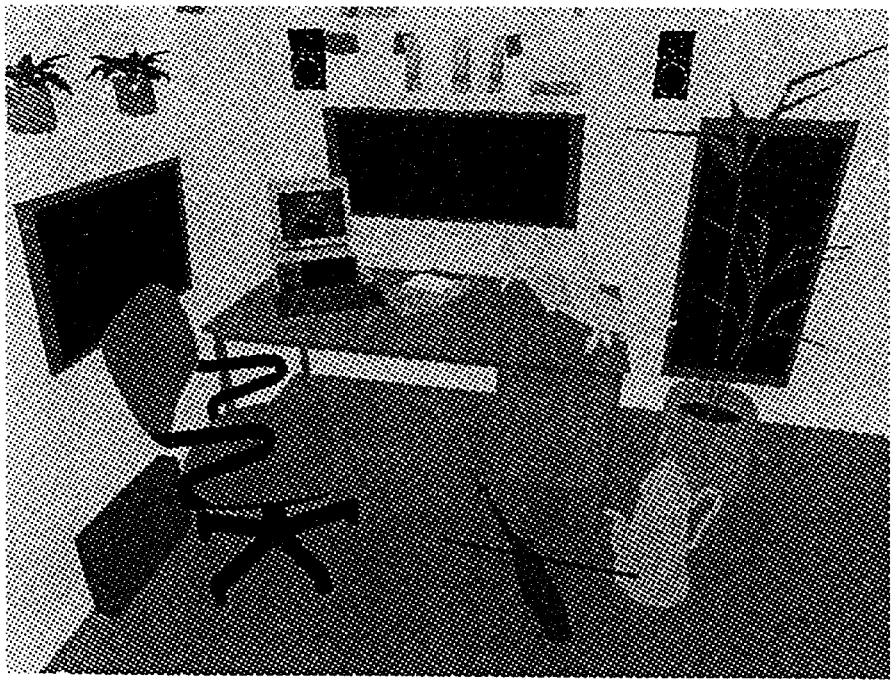
FIGS. 22 to 24 show an image constructed by three methods each in accordance with the invention.

FIG. 22 shows an image which has been created by a ray tracing method in which only primary paths have been used. In this case, all the points on the surfaces in the scene have allocated to them values representing the light received from those points. Thus, those surfaces which are visible have, in effect, been treated as emitters of light. As can be seen, this approach enables the relative positions of objects to be displayed, but does not reveal any information on the effect of one object on the light incident on another.

Figure 23:
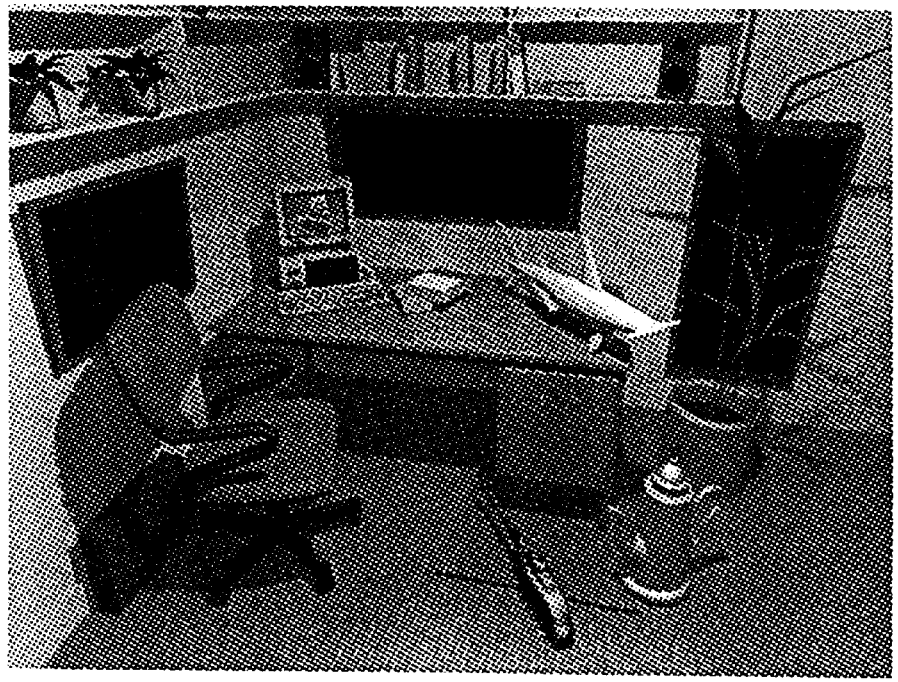

In FIG. 23, primary and secondary paths are used and the scene is illuminated by a notional single light source positioned out of the plane of FIG. 23. In this case, some of the surfaces in the scene are also treated as emitters of light so that the areas of shadow are not shown as completely black. It will be seen that although shadow and surface shine are now apparent, no reflection is visible in the mirrors arranged behind the plant, the desk and the chair.

Figure 24:
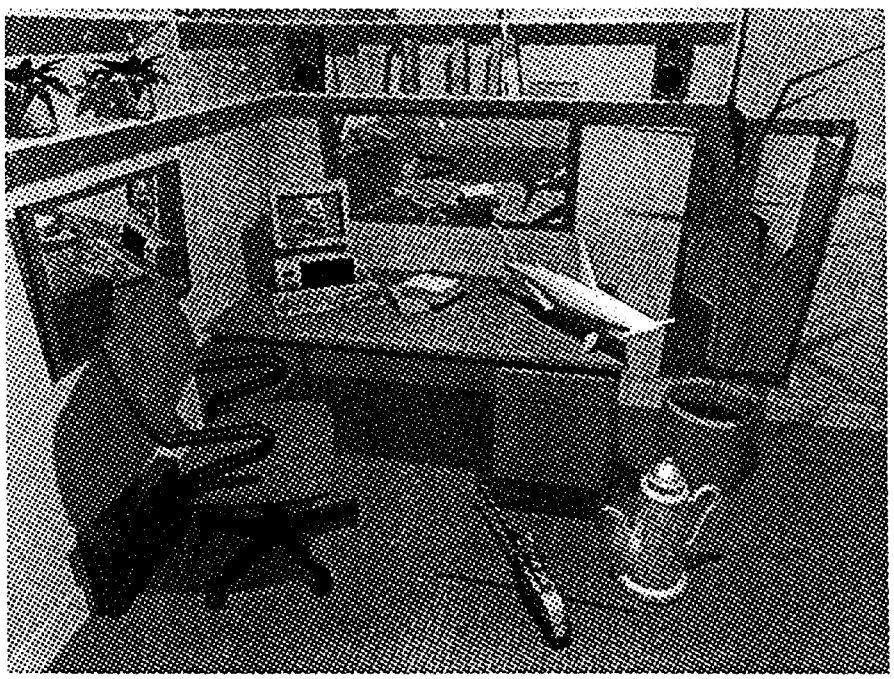

However, when the tertiary sets of paths are used, those reflections become visible, as shown in FIG. 24.

I claim:

1. A method of constructing an image of a notional scene, containing a plurality of objects, as viewed from one of a plurality of possible viewing positions and illuminated in a known manner, from information on the co-ordinates of the set of surfaces defining the objects, on the optical characteristics of all the points on those surfaces and on the particular illumination, which information is stored in a computer memory, the method comprising the steps of:

A. Allocating the surfaces into a plurality of subsets each containing one or more surfaces;

B. Projecting from the viewing position a plurality of straight line paths and storing data describing all said paths;

C. For one of the subsets, determining which, if any, of the straight line paths intersect at least one of the surfaces in that subset, or a zone of illumination and determining the co-ordinates of said intersections;

D. Repeating step C above for the other subset or for each other subset in turn;

E. Determining, for each path which intersects a surface or zone of illumination, the nearest intersection to the viewing position and storing same with data on the object surface or zone of illumination at that intersection;

F. Determining, for each nearest intersection the light which will pass along the path to the viewing position from said intersection and storing same as light intensity and position data; and G. Reading out the stored light intensity and position data, to produce a picture signal for a visual display.

2. A method according to claim 1 in which said plurality of straight line paths are of a sufficient number to enable the whole of the image to be constructed.

3. A method according to claim 1 in which step F involves, for each nearest intersection with a surface, generating a set of one or more secondary straight line paths, from an origin defined by said nearest intersection, if the characteristics of the surface at the origin are such that light incident thereon along the or each secondary path will be directed to said viewing position, determining the intersections of the or each secondary path with other surfaces or zones of illumination closest to said origin in accordance with steps C and D and calculating at least the intensity of light incident on the origin along each secondary path, and calculating, from the characteristics of the surface at the origin, at least the intensity of that light which is incident on the viewing position from the origin.

4. A method according to claim 3 in which step F involves the further steps of generating one or more further sets of straight line paths, in a similar fashion to the secondary straight line paths, from the origins defined by selected intersections of the previous set of straight line paths and determining the intensity of light incident on those origins along directions defined by said further set of paths.

5. A method according to claim 1 in which the determining of which straight line paths intersect a selected surface includes the step of determining whether each path intersects a notional envelope which contains said surface, and discarding the path from further consideration in relation to the surface if it does not intersect the envelope.

6. A method according to claim 5 in which the number of paths which need to be considered in relation to the envelope is reduced by determining which paths intersect a larger envelope which contains a said envelope, and discarding paths which do not intersect said larger envelope from consideration in relation to the envelope.

7. A method according to claim 3 in which, where the surface characteristic of an object at said origin is such that incident light thereon would be diffused or scattered in a multitude of directions, so that light from each of a multitude of further paths would be directed along said previous path, only one such further path is generated at random.

8. Apparatus for constructing an image of a notional scene containing a plurality of objects as viewed from one of a plurality of possible viewing positions, the apparatus comprising:

memory means on which information on the co-ordinates of the surfaces of the objects, the optical characteristics of all the points on those surfaces and on the illumination for the scene is stored, the co-ordinate data being arranged in subsets each containing data for one or more object surfaces;

ray tracing means for projecting from the viewing position a plurality of straight line paths for determining which, if any, of the paths intersect a surface of each object or a zone of illumination, and for selecting the intersections of each path closest to the viewing position;

calculating means for determining, from the data on the object surfaces at said intersections and on the illumination of the scene, at least the intensity of the light which will pass along each said path to the viewing position; and output means for generating a picture signal, representative of said intensities, for display on a visual display, wherein all the intersections for a first subset of one or more object surfaces selected by the ray tracing means are determined before the intersections with the or each other subset, so that the intersections are determined in respect of each subset in turn.

9. Apparatus according to claim 8 in which the ray tracing means comprises a plurality of data processors which are all connected to the memory, the arrangement being such that each processor generates a respective group of straight line paths for a respective part of the image, the memory broadcasts each subset in turn to the processors, and the intersections of each group with the or each surface of a selected subset are determined concurrently.

10. Apparatus according to claim 9 in which each processor comprises a dedicated chip specifically configured to perform the ray tracing operations.

11. Apparatus according to claim 10 in which each processor is so arranged as to perform different operations on different paths, in its respective group, concurrently.

12. Apparatus according to claim 8 in which the calculating means is so arranged as to combine the effects of the interactions of a notional light ray at the relevant interfaces by a process of logarithmic arithmetic.

13. Apparatus according to claim 8 in which the ray tracing means is operable to create a logarithmic representation of the co-ordinates of each straight line path and to test each path for intersections and determine the co-ordinates of the nearest intersections by means of logarithmic calculations.

14. Apparatus according claim 9 in which each ray tracing processor is arranged to test its respective group of straight line paths for intersections with notional envelopes which contain the surface or surfaces in respect of which said intersection tests are to be conducted, and the apparatus has storage means for storing data identifying the paths which have intersected the envelope so that further intersection tests can subsequently be performed by the processor on those paths.

15. Apparatus according to claim 14 in which the storage means is also arranged to store the co-ordinates of said envelopes, and comprises part of said memory means.

16. Apparatus according to claim 9 in which said processors also incorporate the calculating means so that each processor is also operable to calculate the intensity of light travelling along each of its paths to the viewing position.

17. Apparatus according to claim 16 in which each processor includes or is connected to a respective texture memory unit which is connected to the memory means, and which is operable temporarily to store a texture map of surface characteristics of the surface or surfaces in the scene within a region defined by the boundary of the map for access by the calculating means to enable the latter to calculate the light intensities and/or colours in respect of the straight line paths intersecting the surfaces in said region.

18. Apparatus according to claim 17 in which the memory means is operable to overwrite any texture map currently stored in each texture store to enable the calculating means to calculate the light intensities and/or colours in respect of straight line paths which intersect surfaces in a different region of the scene.

19. Apparatus according to claim 17 in which the processor is operable to determine which paths intersect a texture map on a surface by dividing the surface into one or more regions and determining which paths intersect a region which contains the co-ordinates of at least part of the map and then determining which of these paths intersect the region defined by the co-ordinates of the map.

20. A method according to claim 3 in which each set of secondary or further set of straight line paths is generated when an intersection of the previous straight line path is found, and before the intersection of the previous path nearest its origin or, as the case may be, the viewing position is determined, and each set of secondary or further paths which does not originate from said nearest intersection is subsequently discarded.

21. A method of constructing an image of a notional scene, containing a plurality of objects, as viewed from one of a plurality of possible viewing positions and illuminated in a known manner, from information on the co-ordinates of the set of surfaces defining the objects, on the optical characteristics of all the points on those surfaces and on the particular illumination, which information is stored in a computer memory, the method comprising the steps of A. allocating the surfaces into a plurality of subsets each containing a respective group of surfaces;

B. projecting from the viewing position a plurality of straight line paths and storing data describing all said paths;

C. for one of the subsets, determining which, if any, of the straight line paths intersect at least one of the surfaces in that subset, or a zone of illumination and determining the co-ordinates of said intersections;

D. repeating step C above for the other subset or for each other subset in turn;

E. determining, for each path which intersects a surface or zone of illumination, the nearest intersection to the viewing position and storing same with data on the object surface or zone of illumination at that intersection;

F. determining, for each nearest intersection the light which will pass along the path to the viewing position from said intersection and storing same as light intensity and position data; and G. reading out the stored light intensity and position data, to produce a picture signal for a visual display, wherein all the paths are generated before intersections with the surfaces are determined, all the paths are tested for intersections with all the surfaces in a given subset before any one of the paths is tested for intersections with the surfaces in the next subset and wherein information on the position and shape of each surface is stored in memory means from which information on the surface is retrieved only once in order to determine intersections of that surface with all the paths.

* * * * *